US012775382B2

(12) United States Patent
Lee et al.

(10) Patent No.: US 12,775,382 B2
(45) Date of Patent: Oct. 27, 2026

(54) SYSTEMS AND METHODS OF DATA STAGING FOR DRAM TIMING COMPLIANCE IN NAND MEMORY

(71) Applicant: Samsung Electronics Co., Ltd., Suwon-si (KR)

(72) Inventors: Ho Bin Lee, San Jose, CA (US); Hyoun Kwon Jeong, Pleasanton, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 43 days.

(21) Appl. No.: 19/060,623

(22) Filed: Feb. 21, 2025

(65) Prior Publication Data

US 2026/0037131 A1 Feb. 5, 2026

Related U.S. Application Data

(60) Provisional application No. 63/679,016, filed on Aug. 2, 2024.

(51) Int. Cl.
*G06F 3/06* (2006.01)

(52) U.S. Cl.
CPC .......... *G06F 3/0611* (2013.01); *G06F 3/0656* (2013.01); *G06F 3/0659* (2013.01); *G06F 3/0679* (2013.01)

(58) Field of Classification Search
CPC .... G06F 3/0611; G06F 3/0656; G06F 3/0659; G06F 3/0679; G06F 3/061
See application file for complete search history.

(56) References Cited

U.S. PATENT DOCUMENTS

| | | | | |
|---|---|---|---|---|
| 9,552,175 | B2 | 1/2017 | Takefman et al. | |
| 9,582,431 | B2 | 2/2017 | Cohen | |
| 10,445,229 | B1 | 10/2019 | Kuzmin et al. | |
| 10,949,094 | B2 | 3/2021 | Lee et al. | |
| 2018/0059933 | A1 | 3/2018 | Helmick et al. | |
| 2020/0272351 | A1* | 8/2020 | Iizawa | G06F 3/0647 |
| 2022/0222191 | A1 | 7/2022 | Chen et al. | |
| 2024/0086328 | A1* | 3/2024 | Vazhkudai | G06F 3/061 |
| 2024/0386934 | A1* | 11/2024 | Hamo | G11C 11/40615 |
| 2026/0010317 | A1* | 1/2026 | Southwell | G06F 3/0659 |

* cited by examiner

*Primary Examiner* — Sean D Rossiter
(74) *Attorney, Agent, or Firm* — Renaissance IP Law Group LLP

(57) ABSTRACT

Provided are systems, methods, and apparatuses for memory bus timing synchronization. In one or more examples, the systems, devices, and methods include data staging for memory module, the method comprising: storing one or more parameters of a host command in a command table based on receiving, from a host, a host command for the memory of the memory module; estimating a cycle time for completing the host command at the memory; and providing, to the host via the memory of the memory module, data in a buffer of the memory module, the data being stored in the buffer based on the memory completing the host command.

20 Claims, 13 Drawing Sheets

500

| **Latency** <br> **505** | **Operation** <br> **510** |
|---|---|
| tR | NAND Read |
| tProg | NAND Program |
| tBERS | NAND Erase |
| ReadCnt[Chan][Chip][Die][Plane] | Queued Read Count of a Plane |
| WriteCnt[Chan][Chip][Die][Plane] | Queued Write Count of a Plane |
| EraseCnt[Chan][Chip][Die][Plane] | Queued Erase Count of a Plane |
| RunningIOType[Chan][Chip][Die][Plane] | Running IO Type (RWE) of a Plane |
| IOStartCycle[Chan][Chip][Die][Plane] | Running IO Start Clock Cycle of a Plane |

FIG. 5

600

| Tag 605 | Cmd 610 | Addr 615 | Cycle 620 | Buf Addr 625 | Cancel 630 | Cmp Bit 635 |
|---|---|---|---|---|---|---|
| 0 | R | [x] | 100 | 11000 | 0 | 0 |
| 1 | W | [y] | 10 | 12000 | 1 | 1 |
| ... | ... | ... | ... | ... | ... | ... |

FIG. 6

SYSTEMS AND METHODS OF DATA STAGING FOR DRAM TIMING COMPLIANCE IN NAND MEMORY

CROSS-REFERENCE TO RELATED APPLICATIONS

This application claims the benefit of U.S. Provisional Patent Application Ser. No. 63/679,016, filed Aug. 2, 2024, which is incorporated by reference herein for all purposes.

TECHNICAL FIELD

The disclosure relates generally to memory systems, and more particularly to systems and methods of memory bus timing synchronization (e.g., for wide-IO NAND memory).

BACKGROUND

The present background section is intended to provide context only, and the disclosure of any concept in this section does not constitute an admission that said concept is prior art.

Artificial intelligence (AI) workloads demand memory and storage solutions that provide high throughput and low latency to accommodate rapid processing of relatively large datasets. High throughput memory/storage ensures data can be read and written quickly. Low latency memory/storage provides quick data access for real-time AI applications. However, the proliferation of AI has resulted in a rapid increase in demands for improvements in data movement bandwidths and data storage capacity, which has left data centers and related devices struggling to keep up with demand.

SUMMARY

In various embodiments, the systems and methods described herein include systems, methods, and apparatuses for memory bus timing synchronization (e.g., for wide-IO NAND memory). In some aspects, the techniques described herein relate to a method of data staging for a memory module including memory, the method including: storing one or more parameters of a host command in a command table based on receiving, from a host, the host command for the memory of the memory module; estimating a cycle time for completing the host command at the memory; and providing, to the host via the memory of the memory module, data in a buffer of the memory module, the data being stored in the buffer based on the memory completing the host command.

In some aspects, the techniques described herein relate to a method, further including reading, based on the host command including a read command, the data from a location of the memory indicated in the host command.

In some aspects, the techniques described herein relate to a method, further including storing the data in a memory region of the buffer, wherein the memory region is associated with a buffer address included in the host command.

In some aspects, the techniques described herein relate to a method, further including querying the command table for the buffer address based on receiving, via a data address space of the host, a load instruction from an application of the host, the load instruction being associated with the data based on a command tag that is associated with the data and the load instruction.

In some aspects, the techniques described herein relate to a method, further including providing, in response to a poll command from the host, a status of the host command, the status including at least a lowest estimated latency of N milliseconds associated with a data staging command pending in the command table.

In some aspects, the techniques described herein relate to a method, wherein a memory controller of the memory receives the host command via a control address space of the host.

In some aspects, the techniques described herein relate to a method, wherein the one or more parameters of the host command include at least one of a command tag of the host command, a command type, a command address, the cycle time, a buffer address indicating a location where the data is stored in the buffer, a cancel indicator indicating a cancelation status of the host command, and a completion indicator indicating a completion status of the host command.

In some aspects, the techniques described herein relate to a method, further including updating the completion indicator based on completing the host command.

In some aspects, the techniques described herein relate to a method, wherein: a first ranked memory of the memory module includes dynamic random-access memory, and the memory is a second ranked memory of the memory module that includes NAND flash memory.

In some aspects, the techniques described herein relate to a method, further including providing the data to the host based on transferring the data from the buffer to a physical interface of the first ranked memory and the second ranked memory, wherein the second ranked memory communicates messages or data via the physical interface.

In some aspects, the techniques described herein relate to a method of data staging for a memory module including a memory, the method including: storing one or more parameters of a host command in a command table based on receiving, from a host, a host command for the memory of the memory module; estimating a cycle time for completing the host command at the memory; and receiving, from the host via a physical interface of the memory module, data based on receiving the host command, the data being stored in a memory region of a buffer of the memory module.

In some aspects, the techniques described herein relate to a method, further including allocating the memory region of the buffer for a store instruction based on the host command including a write command.

In some aspects, the techniques described herein relate to a method, further including: receiving, via a data address space of the host, a store instruction from an application of the host; and receiving, based on the store instruction, the data, the data being received at a memory controller of the memory module from the physical interface of the memory module.

In some aspects, the techniques described herein relate to a method, further including: converting the store instruction to a NAND write command; and storing the data in the buffer based on scheduling the NAND write command.

In some aspects, the techniques described herein relate to a method, further including receiving the data from the host based on the host transferring the data to the buffer via a physical interface of the memory module.

In some aspects, the techniques described herein relate to a method, further including updating a completion indicator of the command table based on completing the host command.

In some aspects, the techniques described herein relate to a method, wherein: a first ranked memory of the memory module includes dynamic random-access memory, and the memory is a second ranked memory of the memory module that includes NAND flash memory.

In some aspects, the techniques described herein relate to a non-transitory computer-readable medium associated with a memory module including a memory, the non-transitory computer-readable medium storing code that includes instructions executable by a processor to: storing one or more parameters of a host command in a command table based on receiving, from a host, a host command for the memory of a memory module; estimating a cycle time for completing the host command at the memory; and providing, to the host via the memory of the memory module, data in a buffer of the memory module, the data being stored in the buffer based on the memory completing the host command.

In some aspects, the techniques described herein relate to a non-transitory computer-readable medium, wherein the code includes further instructions executable by the processor to read, based on the host command including a read command, the data from a location of the memory indicated in the host command.

In some aspects, the techniques described herein relate to a non-transitory computer-readable medium, wherein the code includes further instructions executable by the processor to store the data in a memory region of the buffer of the memory module, wherein the memory region is associated with a buffer address included in the host command.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods of memory bus timing synchronization for wide-IO NAND memory described herein include multiple advantages and benefits. For example, based on the systems and methods described, a wide-IO NAND may meet low-power double-data rate (LPDDR) timing constraints. For example, the systems and methods may include masking wide-IO NAND latency to enable wide-IO NAND to meet DDR timing constraints. In some cases, the systems and methods may minimize or avoid modification of the LPDDR controller (e.g., avoid modifying available LPDDR controllers).

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 5 illustrates an example data structure in accordance with one or more implementations as described herein.

FIG. 6 illustrates an example data structure in accordance with one or more implementations as described herein.

Figure 1:
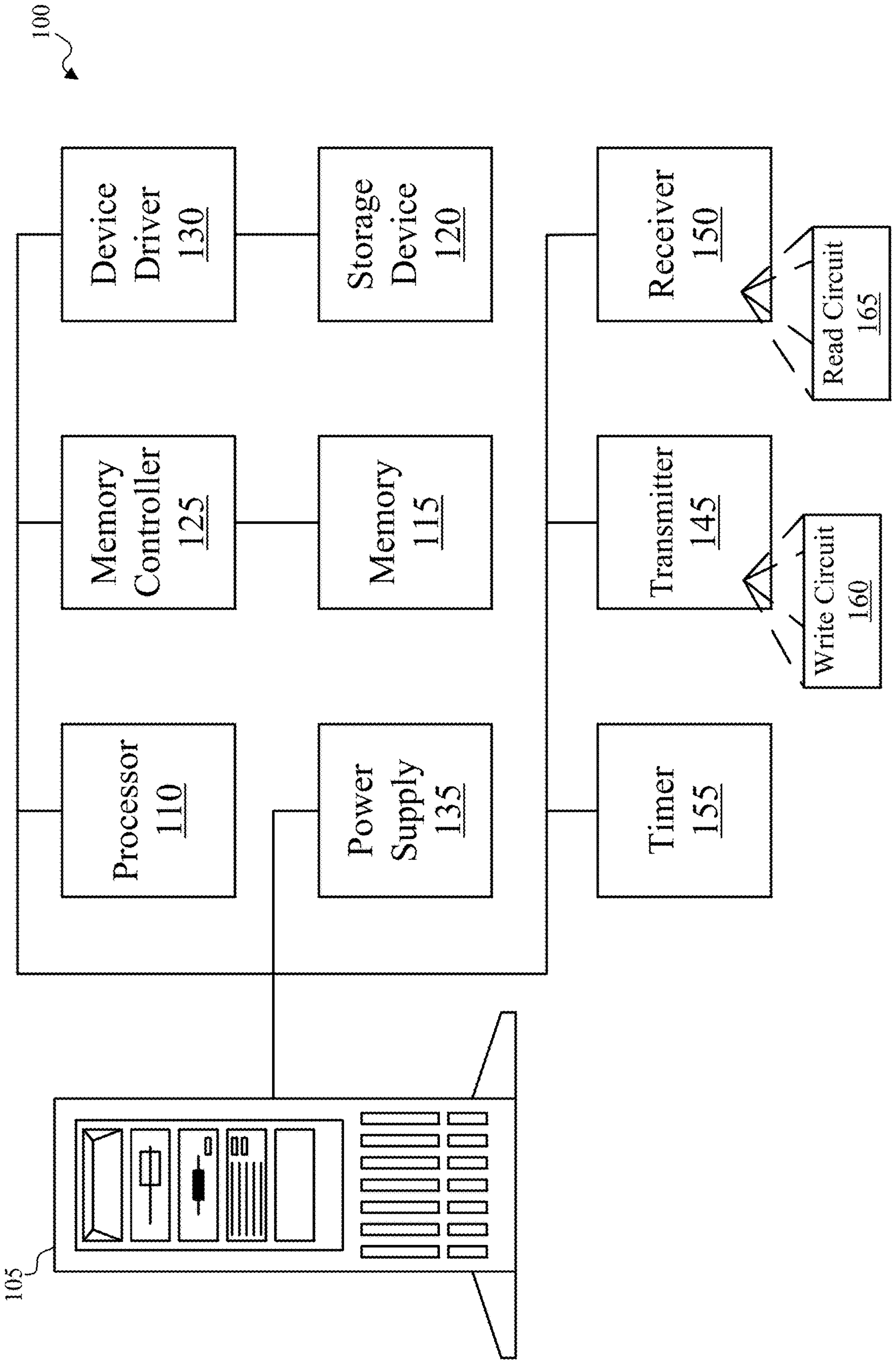
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of a hardware embodiment, a computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, a hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Data processing may include data buffering, aligning incoming data from multiple communication lanes, forward error correction (FEC), etc. For example, data may be received by an analog front end (AFE), which can prepare the incoming data for digital processing. The digital portion of the transceivers (e.g., digital signal processor (DSP)) may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, SoC, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

The systems and methods described herein may be based on and/or may include artificial intelligence (AI). AI can include the concept of creating intelligent machines that can sense, reason, act, and adapt. Machine learning (ML) may be a subset of AI that helps build AI-driven applications. AI programs can include Large Language Models (LLMs). LLMs can use deep learning to analyze and generate content based on large amounts of data. LLMs can perform a variety of tasks, including text generation, summarization, translation, question answering, creative writing, code generation, chatbots, virtual assistants, etc. Deep learning can be a subset of machine learning that uses artificial neural networks to mimic the learning process of the human brain. Deep learning algorithms can use large amounts of data and complex algorithms to train a model. Neural networks can be the foundation of deep learning algorithms. In some cases, AI training can be a first step in a two-part process of machine learning training and inference. AI training can include teaching AI models to perform tasks based on providing the AI models with training data. AI training can include feeding known, curated data to algorithms and improving the AI models based on testing and feedback. AI inference can include the process of using a trained AI model to make predictions. For example, AI inference can include applying a trained AI model to analyze new, unknown data and make predictions or decisions, using patterns the AI model identifies during training to interpret and respond to fresh information in real-world situations. Inference can be faster than training because inference does not include the model adjusting its parameters based on new data. Inference also uses less processing power than training clusters. AI can include AI inference delegation. AI inference delegation can include assigning tasks that involve using a trained AI model to make predictions or decisions on new data to a specific system or device, delegating AI processing to that entity. AI inference delegation can include identifying which tasks are best suited for a given AI model and assigning tasks accordingly. AI inference delegation techniques provide scalable memory bandwidth and scalable memory capacity to accommodate increased query lengths and increased number of concurrent users.

The systems and methods described herein may be based on and/or may include a neural processing unit (NPU). NPUs can include a specialized processor that executes machine learning algorithms. NPUs are also called AI accelerators or intelligent processing units (IPUs). NPUs improve the inference performance of neural networks. NPUs work similarly to the human brain. They are made to mimic nerve cells and synapses that transmit and receive signals to and from each other. NPUs use a data-driven parallel computing architecture to process large amounts of multimedia data, like text, images and videos. NPUs may be used to offload specific workloads, allowing dedicated hardware to focus on more specialized tasks.

The systems and methods described herein may be based on and/or may include wide input/output (IO) memory. Wide IO memory can include a memory interface for 3D integrated circuits, including 3D memory. Wide IO memory can include a low-power, high-bandwidth memory (e.g., flash memory, NAND memory, DRAM, etc.) that uses 3D stacking with Through Silicon Via (TSV) interconnects to stack memory chips directly on a System on a Chip (SoC). Wide IO memory is well-suited for applications with increased memory bandwidth. Wide IO memory can reduce I/O power consumption due to wide IO memory being directly attached to DRAM (e.g., bypassing traditional memory pathways) and due to its low-capacitance TSVs. In some cases, the systems and methods may include wide-IO NAND for running applications (e.g., LLM AI applications). Wide-IO NAND may be used as a rank-based memory extension. The systems and methods described herein may be based on and/or may include a wide-IO NAND device. A given memory module may include DRAM and wide-IO NAND. In some examples, a memory module may include ranked memory (e.g., rank 0 DRAM, rank 1 wide-IO NAND, etc.).

The systems and methods described herein may be based on and/or may include High Bandwidth Memory (HBM). HBM can include a type of memory architecture used in high-performance computing applications that requires fast data transfer speeds. HBM uses 3D stacking technology to pack more memory chips into a smaller space, which reduces the distance data needs to travel between the processor and memory. This results in higher bandwidth, which allows for faster data transfer, and lower power consumption, which can help extend battery life.

The systems and methods described herein may be based on and/or may include High Bandwidth NAND (HBN). HBN can include a type of memory (e.g., NAND memory) that can read and program by block or plane instead of line. HBN may be based on a bumpless TSV. In some cases, HBN may be used for Non-volatile memory/storage, while High Bandwidth Memory (HBM) may be used for RAM. HBN may include a type of memory chip with low power consumption and wide communication lanes. In some cases, high bandwidth NAND may be referred to as High Bandwidth Flash. NAND memory can be a type of flash memory.

The systems and methods described herein may be based on and/or may include NAND planes. A NAND plane may include a sub-section of a given NAND flash memory chip. The NAND plane may include a group of blocks that can be accessed independently and simultaneously, allowing for parallel data transfer and improved performance. Thus, a plane may include a subdivision of a given NAND die that includes multiple blocks of memory cells, enabling faster data read/write operations compared to accessing a single block at a time. The "erase count" of NAND can refer to the number of times an erase has occurred at a specific block of NAND flash memory. The erase count can be used to determine whether the block of NAND flash memory remains reliable, which can be measured in program/erase (P/E) cycles. A NAND flash memory's "read count" may refer to the number of times a NAND flash memory cell can be read before it starts to degrade and may no longer reliably store data, which may lead to potential degradation due to "read disturb," a phenomenon where reading one cell can slightly affect nearby cells, leading to potential data corruption. The "write count" of NAND, also known as the program/erase (P/E) cycle count, may refer to the number of times a NAND flash memory cell can be written to and erased before it starts to degrade and can no longer reliably store data.

The systems and methods described herein may be based on and/or may include garbage collection. Garbage collection can include removing invalid data from a flash memory device to free up space for new data. In some cases, garbage collection can include erasing data at the block level, and moving valid data to other blocks for long term storage.

The systems and methods described herein may be based on and/or may include wear leveling. Wear leveling can include evenly distributing write operations across memory blocks (e.g., all memory blocks), preventing a given block from being written to excessively and wearing out prematurely, leveling out the wear on all parts of the storage device by intelligently managing where new data is written.

In NAND flash memory, running IO can refer to a type of data transfer where multiple read or write operations are performed consecutively on the same NAND block, where the data flow may be maintained without significant pauses between individual operations, maximizing the data throughput and achieving high performance. The running I/O type can include read, write, or erase running IO. Running IO can include accessing data in a sequential manner, where data is read or written to adjacent locations within the NAND block, which can optimize the read/write process. Running IO can include maintaining a continuous stream of data transfer, which can minimize the latency associated with seeking new locations on the flash memory.

The systems and methods described herein may be based on and/or may include Compute Express Link (CXL) memory. CXL memory can include memory with a high-speed interface that allows for communication between devices such as processors, memory, accelerators, storage, and other IO devices. CXL memory can be designed for high-performance data center computers and may use a Peripheral Component Interconnect Express (PCIe) physical and/or electrical interface. The systems and methods described herein may be based on and/or may include Low-Power Double Data Rate (LPDDR). LPDDR can include a type of synchronous DRAM that may be used in high-bandwidth data transfers while still being energy efficient.

The systems and methods described herein may be based on and/or may include memory prefetching. In some cases, a memory-side prefetcher may use a prefetching configuration to predict what data to prefetch into memory (e.g., into faster memory), which allows for higher-performance. Prefetching can include predicting data most likely to be called by a processor, retrieving the data, and storing the prefetched data in a buffer memory (e.g., cache) before the processor calls for the data.

A virtual address space may include a set of ranges of virtual addresses that a host (e.g., operating system) makes available to a process. For example, a host may instruct a CPU to generate a virtual address for a program (e.g., while the program is running). This address space may be considered virtual or logical because the address space does not exist physically. The host may use the virtual address to access a physical address of a storage device, which is the physical location of data in memory, such as RAM. In some cases, a Memory Management Unit (MMU) may map the virtual address to the physical address (e.g., before the virtual address is used). This mapping allows a program to act as if it has exclusive use of the main memory, even when other processes are also running on other virtual address spaces.

The systems and methods described herein may be based on and/or may include logical block addressing (LBA). LBA may be used to identify blocks of data on a storage device (e.g., SSD). LBA can include an addressing scheme that uses an integer index to locate blocks, with the first block being LBA 0, the second LBA 1, and so on. The systems and methods described herein may be based on and/or may include logical to physical (L2P) mapping. L2P mapping can include a table (e.g., L2P mapping table) that tracks the assignments of LBAs to physical block addresses (PPNs) in storage device (e.g., NAND flash SSDs. The L2P table may be stored in system data of an SSD and may be updated whenever a write operation occurs on an LBA.

The systems and methods described herein may be based on and/or may include out-of-band operations and/or operations based on out-of-band data, etc. In computer networking, out-of-band (OOB) data can include a separate stream of data that is independent from a main data stream. OOB data may be received by connection-oriented (e.g., stream) sockets regardless of the position of the data in the stream, or the order in which the data is sent. OOB data can be delivered to a socket independently of a main receive queue or default data receive queue.

The systems and methods described herein may be based on and/or may include load instructions and/or store instructions. A program may use load instructions and store instructions to perform processing in conjunction with execution of the program. A load instruction may transfer data from memory into a register in a processor. The processor may use the data in the register to perform a task. A store instruction may transfer data from a register of a processor to a location in memory. Accordingly, load and store instructions may be used to move data between registers and memory in computer systems. In some cases, load and store instructions may be used for manipulating data, accessing variables, sharing data between programs, etc.

Some systems can cause issues with direct access to wide-IO NAND memory. In some cases, wide-IO NAND may fail to meet memory response timing constraints due to a latency of (e.g., a microsecond latency) of wide-IO NAND. In some cases, wide-IO NAND may fail to meet memory response timing constraints due to delays caused by garbage collection (GC) and/or wear leveling (WL).

The systems and methods described herein avoid or minimize issues with latency, GC, and WL based on memory bus timing synchronization for wide-IO NAND memory. For example, in some cases a host may synchronously execute internal NAND IOs via a control address space before LPDDR IOs (e.g., before executing LPDDR IOs or before LPDDR IOs are executed). The systems and methods may include data staging commands, which may include read commands, write commands, erase commands, poll commands, cancel commands, etc. The data staging command may be sent from a host to a storage device (e.g., wide-IO NAND, NAND controller) and may be referred to as a host command. Based on the data staging commands, the systems and methods may hide or mask the latency of wide-IO NAND memory. In some cases, one or more data staging commands (e.g., wide-IO NAND read commands, wide-IO NAND write commands, poll commands, etc.) may occur before a load instruction or store instruction from a host of the wide-IO NAND memory. Based on the data staging commands, the data for the host read command or host write command is ready for the host (e.g., an application of the host) before the host requests it.

In some examples, the host may view a memory module that includes NAND memory and optionally includes DRAM memory. The host may be unaware that the memory module includes NAND memory (e.g., in addition to DRAM memory), and thus, the host may treat the NAND memory as DRAM memory. In some cases, the NAND memory may include Wide-IO NAND. In some embodiments, the DRAM memory may be located in a first rank of the memory module and the NAND memory (e.g., Wide-IO NAND memory) may be located in a second rank of the memory module. In some cases, the DRAM memory and the NAND memory may share a memory channel, but store data independently. In some implementations, a memory controller (e.g., NAND controller) may use the NAND memory to handle one or more memory requests from the host.

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for case of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory controller 125 may include a DRAM memory controller. Additionally, or alternatively, memory controller 125 may include a NAND memory controller. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe®) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe®) interface, or a Compute Express Link (CXL®) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115. Machine 105 may include power supply 135. Power supply 135 may provide power to machine 105 and its components.

Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. Transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120.

In the illustrated example, machine 105 may include timer 155, which may be used to time one or more operations, indicate a time period, indicate a lapse of time, indicate an expiration, indicate a timeout, track a response time, determine latency or cycle time (e.g., of a data staging command), etc.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, InfiniBand, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, memory controller 125 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of memory controller 125 may be implemented as an SoC.

In some examples, memory controller 125 may include any one or combination of logic (e.g., logical circuit), hardware (e.g., processing unit, memory, storage), software, firmware, and the like. In some cases, memory controller 125 may perform one or more functions in conjunction with processor 110. In some cases, at least a portion of memory controller 125 may be implemented in or by processor 110 and/or memory 115. The one or more logic circuits of memory controller 125 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable memory controller 125 to provide memory bus timing synchronization (e.g., for wide-IO NAND memory).

Figure 2:
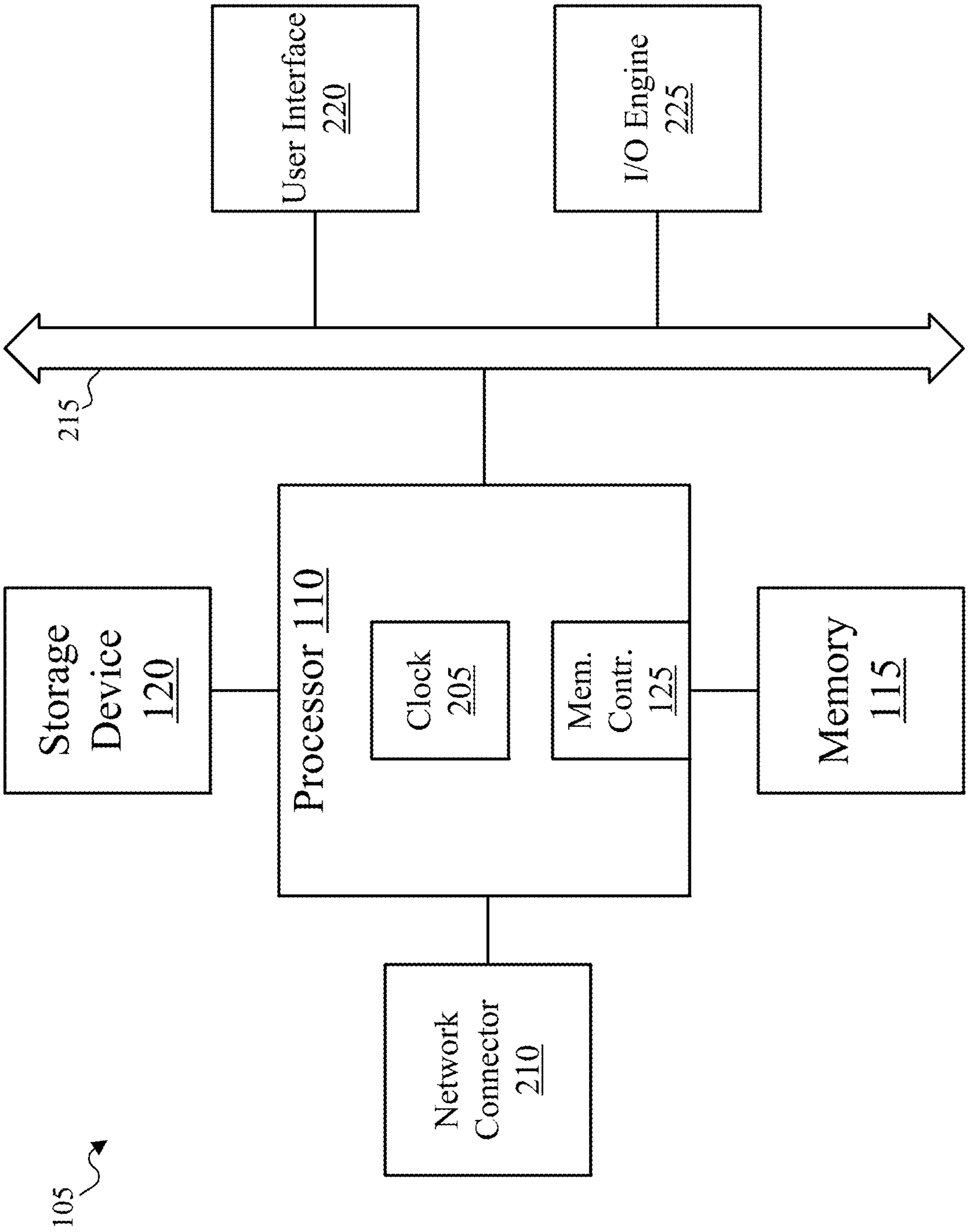
FIG. 2 illustrates details of the system of FIG. 1, according to one or more implementations as described herein.

In one or more examples, memory controller 125 may be configured to avoid or minimize issues with latency, GC, and/or WL based on memory bus timing synchronization for wide-IO NAND memory. In some cases, the memory controller 125 may control aspects regarding data staging commands (e.g., host command), which may include read commands, write commands, poll commands, etc. Based on the data staging commands, memory controller 125 may hide or mask the latency of wide-IO NAND memory. In some cases, one or more data staging commands (e.g., wide-IO NAND read commands, wide-IO NAND write commands, poll commands, etc.) may occur before a load instruction or store instruction from a host of the wide-IO NAND memory. Based on the data staging commands, the data for the host read command or host write command is ready for the host (e.g., an application of the host) before the host requests it. load FIG. 2 illustrates details of machine 105 of FIG. 1, according to examples described herein. In the illustrated example, machine 105 may include processor 110. Processor 110 may include one or more processors and/or one or more dies. Processor 110 may include memory controller 125 (e.g., one or more memory controllers; DRAM controller, NAND controller) and clock 205 (e.g. one or more clocks), which may be used to coordinate the operations of the components of the machine. Processor 110 may be coupled to memory 115 (e.g., one or more memory chips, stacked memory, etc.), which may include random access memory (RAM), read-only memory (ROM), or other state preserving media, as examples. Processor 110 may be coupled to storage device 120 (e.g., one or more storage devices), and to network connector 210, which may be, for example, an Ethernet connector or a wireless connector. Processor 110 may be connected to bus 215 (e.g., one or more buses), to which may be attached user interface 220 (e.g., one or more user interfaces) and Input/Output (I/O) interface ports that may be managed using I/O engine 225 (e.g., one or more I/O engines), among other components.

Figure 3:
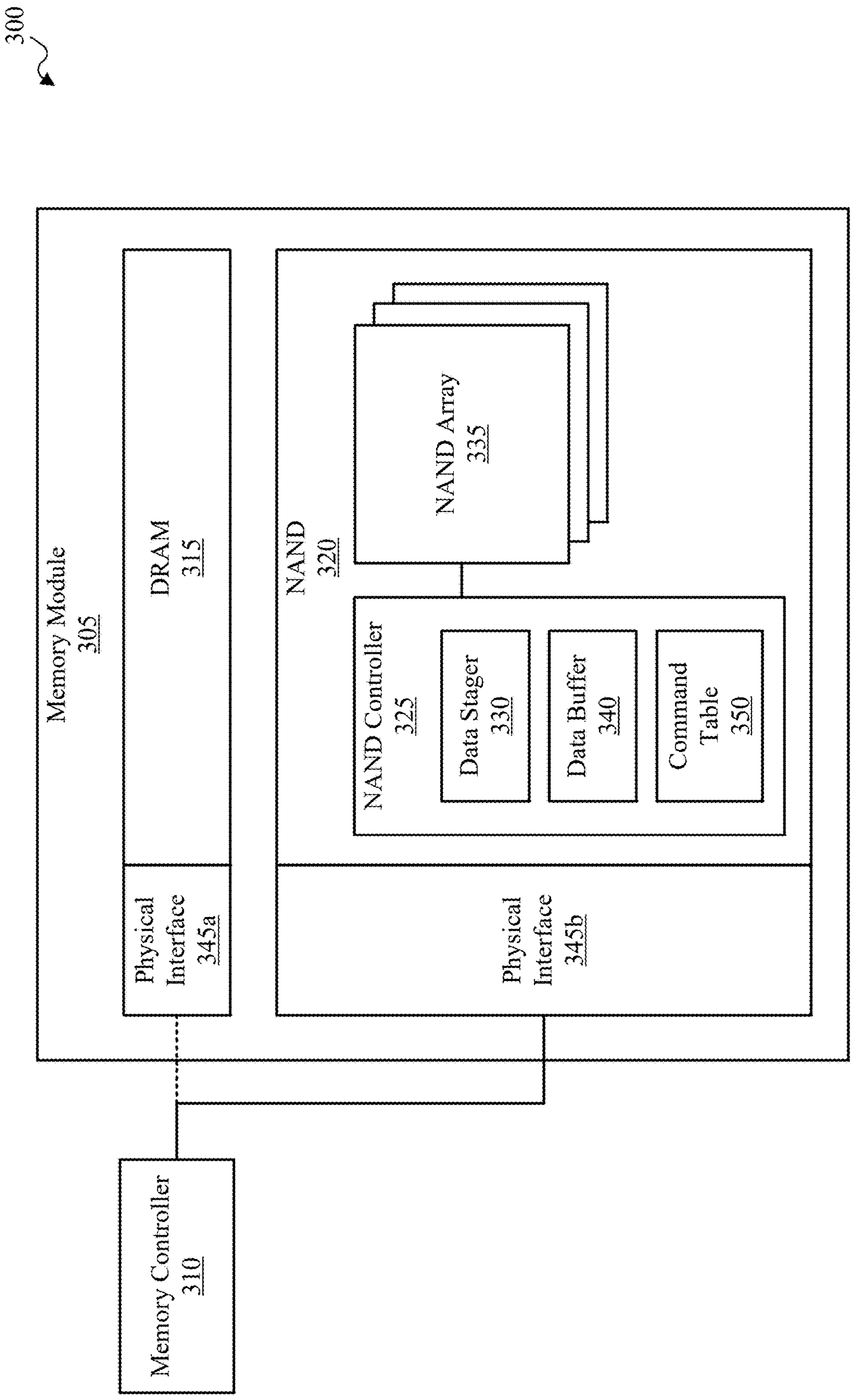
FIG. 3 illustrates an example system in accordance with one or more implementations as described herein.

FIG. 3 illustrates an example system 300 in accordance with one or more implementations as described herein. In some configurations, one or more aspects of system 300 may be implemented by or in conjunction with memory controller 125 of FIG. 1, memory controller 125 of FIG. 2, memory controller 310, and/or NAND controller 325 of FIG. 3. In some configurations, one or more aspects of system 300 may be implemented by or in conjunction with machine 105, components of machine 105, or any combination thereof.

In the illustrated example, system 300 may include memory module 305 and memory controller 310. In some cases, memory module 305 may be an example of memory 115 of FIGS. 1 and 2. Memory controller 310 may be an example of memory controller 125 of FIGS. 1 and 2. As shown, memory module 305 NAND 320 (e.g., NAND rank) and may optionally include DRAM 315 (e.g., DRAM rank). As shown, DRAM 315 may include physical interface 345*a*. In some cases, DRAM 315 may be a first ranked memory (e.g., rank 0) of memory module 305, and NAND 320 may be a second ranked memory (e.g., rank 1) of memory module 305. As shown, NAND 320 may include NAND controller 325, NAND array 335 (e.g., array of wide IO NAND; array of NAND memory cells; one or more NAND flash memory dies), data buffer 340, and physical interface 345*b*. In some cases, NAND array 335 may include a wide-IO NAND memory array. In some cases, DRAM 315 includes a first physical interface (e.g., physical interface 345*a*) and NAND 320 includes a second physical interface different from the first physical interface (e.g., physical interface 345*b*). Alternatively, system 300 may include a physical interface that is shared between DRAM 315 and NAND 320 (e.g., physical interface 345*a* and physical interface 345*b*).

In some cases, NAND 320 may communicate via physical interface 345*b*. For example, NAND 320 may receive a write command, receive a read command, provide data, receive data, etc., via physical interface 345*b*. In some cases, physical interface 345*a* and/or physical interface 345*b* may include a DRAM physical interface. In some examples, NAND 320 may be configured to follow one or more electrical and/or timing constraints used by DRAM 315 when NAND 320 uses physical interface 345*b*.

In some examples, the host may view memory module 305 as a DRAM memory module. Thus, the host may be unaware that memory module 305 includes NAND memory and may treat NAND 320 as DRAM memory, like DRAM 315. As a result, NAND 320 may be used for processing (e.g., AI processing), including, in some cases, processing with DRAM 315. Based on the systems and methods described herein, NAND 320 provides cost-effective storage as well as a larger storage capacity relative to DRAM, while meeting memory response timing constraints for AI processing.

As shown, NAND controller 325 (e.g., memory controller of NAND 320; memory management of NAND 320) may include data stager 330 (e.g., in-memory data stager), data buffer 340, and/or command table 350. In some examples, data stager 330 may perform data staging operations. In some cases, data stager 330 may provide data staging for memory operations involving NAND 320 (e.g., wide-IO NAND memory). In some cases, a host of memory module 305 and memory controller 310 may send a data staging command (e.g., host command) to NAND 320. In some cases, the data staging command may be received and/or processed by NAND controller 325. Logically, the host may treat or interact with memory module 305 (e.g., the entirety of memory module 305) as a main memory (e.g., traditional DRAM-based main memory), allocating memory as requested by applications and/or an operating system associated with the host. Physically, the host may be expecting memory module 305 (e.g., the entirety of memory module 305) to act as a DRAM. For example, the host may be expecting memory module 305 to function according to DRAM timing parameters and/or DRAM electrical parameters. The data staging operations described herein (e.g., data staging operations of data stager 330) may assist in helping memory module 305 to meet the physical DRAM timing constraints by ensuring that the data is present in data buffer 340 (e.g., based on NAND being slower than DRAM).

In some examples, data buffer 340 may be associated with a NAND (e.g., wide-IO NAND system, NAND 320, NAND controller 325, etc.). In some examples, data buffer 340 may be at least partially implemented in SRAM and/or DRAM. Data buffer 340 may be implemented in NAND 320 (e.g., within the wide IO NAND system of NAND 320). For example, buffer 340 may be physically implemented using SRAM or DRAM. In some cases, buffer 340 may be located within or controlled by a wide-IO NAND system (e.g., NAND 320). As shown, data buffer 340 may be at least partially implemented in (e.g., located within and/or controlled by) NAND controller 325. For example, a memory in NAND controller 325 (e.g., SRAM on NAND controller 325) may include data buffer 340 and/or command table 350.

The host may send the data staging command via a control data address space of the host (e.g., command control address). For example, a host may send a data staging read command to NAND controller 325 via a control address read. Based on the data staging read command, data stager 330 may stage data for a DRAM read via a data buffer in memory module 305 (e.g., data buffer in NAND 320; such as data buffer 435 of FIG. 4). For instance, data stager 330 may allocate a buffer for the DRAM read based on the data staging read command. In some examples, a host may send a data staging write command to NAND controller 325 via a control address write. Based on the data staging write command, data stager 330 may stage data for a DRAM write via the data buffer in memory module 305. For instance, data stager 330 may allocate a buffer for the DRAM write based on the data staging write command.

In some examples, the host may issue one or more poll commands based on the data staging read command or the data staging write command. In some cases, the host may issue the poll command to NAND controller 325. NAND controller 325 may provide data staging status information to the host in response to a poll command. In some cases, the host may read a completion control address for a data read/write staging command until the data staging command is indicated as being completed. In some examples, the data staging status provided by NAND controller 325 to the host may include a completion bitmap and/or a lowest latency (e.g., lowest cycle time; a lowest estimated latency of a data staging command pending in a command table). In some cases, the completion bitmap may indicate the completion status of one or more data staging commands. In some cases, NAND controller 325 may estimate a latency of a given data staging command. The estimated latency may indicate a cycle time (e.g., number of clock cycles; N milliseconds, where N is a positive integer based on a clock cycle of a processor) to complete a data staging command (e.g., to perform a NAND read and provide the read data in a data buffer; to allocate space in the data buffer for a NAND write). The lowest latency may indicate the lowest estimated latency (e.g., lowest estimated cycle time) of one or more data staging commands.

In some examples, physical interface 345*a* and/or physical interface 345*b* may include a DRAM-type physical interface that would allow the memory module 305 to occupy a system memory slot, e.g., to operate as system memory 115. Such DRAM-type physical interfaces may include or be included by, for example, DDR, LPDDR, graphics DDR (GDDR), or the like. In some cases, a NAND device (e.g., NAND 320, NAND controller 325) may communicate messages and/or data (e.g., receive and/or transmit data/messages) via physical interface 345*b*. Physical interface 345*b* may enable NAND 320 to communicate with, memory controller 310, and/or a host (e.g., application of a host; operating system; machine 105, etc.

In some examples, NAND controller 325 may read data from NAND 320 based on completing a data staging read command and may store the read data in data buffer 340. NAND controller 325 may provide the data in data buffer 340 to the host based on NAND controller 325 receiving a DRAM read command (e.g., load instruction) from the host (e.g., from an application of the host or operating system). In some cases, based on the load instruction, NAND controller 325 may transfer the data in data buffer 340 to physical interface 345*b* and the host may access the data via physical interface 345*b*.

In some examples, NAND controller 325 may allocate an address space in data buffer 340 based on NAND controller 325 receiving a data staging write command from the host and/or based on completing the data staging write command. The host may write data to data buffer 340 based on the DRAM write command (e.g., store instruction). In some cases, the host may provide the data to NAND 320 via physical interface 345*b* and NAND controller 325 may transfer the data from physical interface 345*b* to data buffer 340. In some cases, NAND controller 325 may transfer or copy the data in data buffer 340 to NAND 320.

Figure 4:
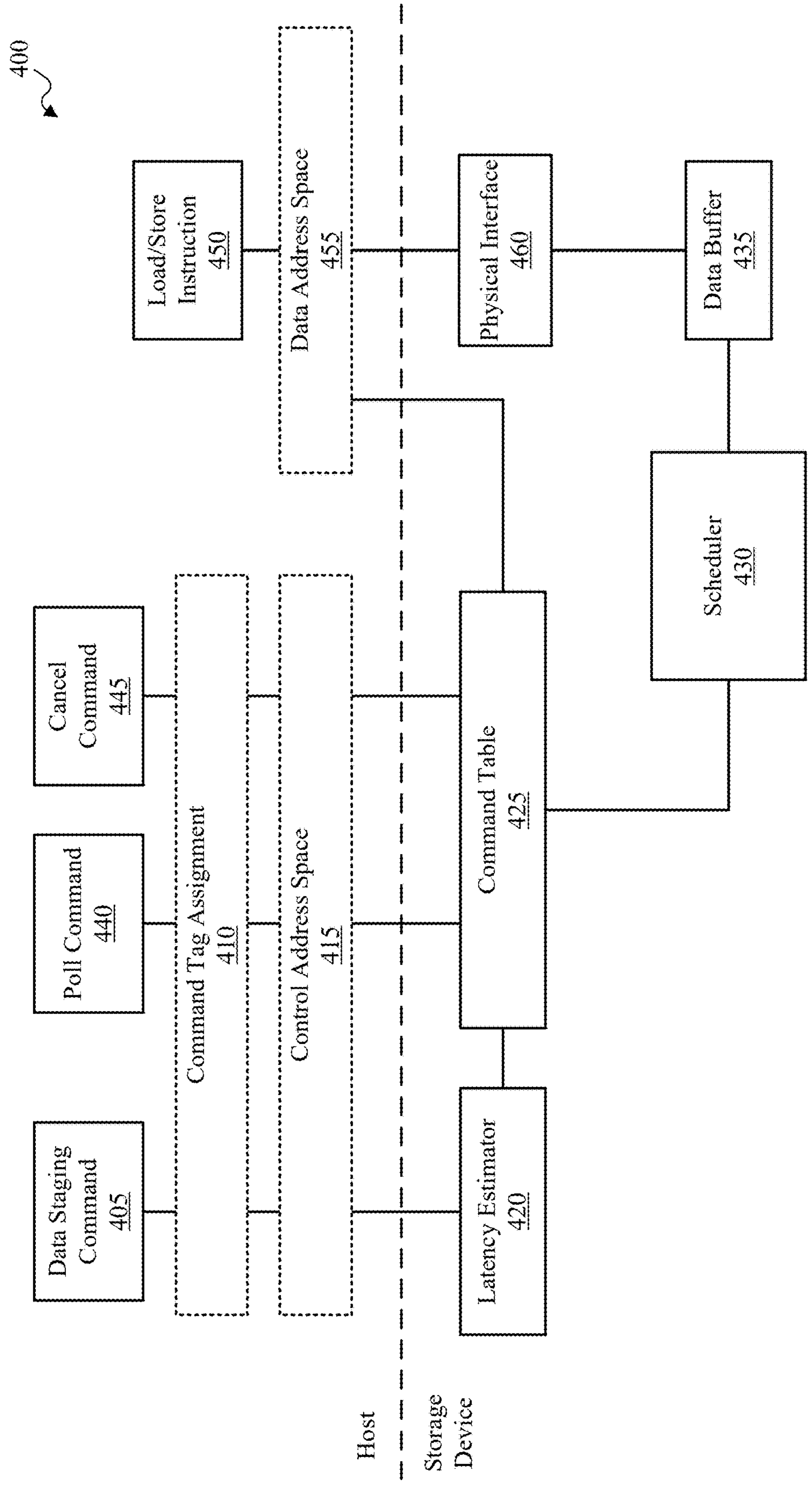
FIG. 4 illustrates an example system flow in accordance with one or more implementations as described herein.

FIG. 4 illustrates an example system flow 400 in accordance with one or more implementations as described herein. In some configurations, one or more aspects of system flow 400 may be implemented by or in conjunction with memory controller 125 of FIG. 1, memory controller 125 of FIG. 2, memory controller 310, and/or NAND controller 325 of FIG. 3. In some configurations, one or more aspects of system flow 400 may be implemented by or in conjunction with machine 105, components of machine 105, or any combination thereof.

At 405, a host (e.g., machine 105, operating system (OS), or application of a host) may generate and/or send a data staging command (e.g., host command) to a storage device (e.g., storage device 120, memory device with NAND flash and DRAM memory, memory module 305, a wide-IO NAND storage device, etc.). In some cases, the data staging commands may include one or more data staging read commands and/or one or more data staging write commands. In some cases, the host may execute (e.g., synchronously execute) storage IOs (e.g., NAND IOs). The host may synchronously stage data on a buffer of the storage device based on the host sending data staging commands and/or poll commands (e.g., storage IOs). In some cases, the host may send the data staging commands and/or poll commands based on an OS or application of the host. The host may send the data staging commands and/or poll commands before associated data is accessed by the OS or application of the host.

At 410, the host may assign a command tag to a data staging command and/or to a poll command. In some examples, the host may send the data staging commands and/or poll commands via control address space 415 (e.g., control address space of the host). In some cases, a data staging command may be a control address command and/or a poll command may be a control address command. The control address space may include a portion of a memory address space (e.g., portion of the host's address space) that is dedicated to managing system control functions. The control address space may be used by the host or operating system to store control data related to system operations and device management, allowing direct access to hardware components and control signals without going through the user address space (e.g., bypassing a user address space; bypassing a data address space of the host).

In some examples, the storage device, via latency estimator 420, may estimate a response latency for staging data for a load instruction or store instruction of an application of the host. For example, the storage device, via latency estimator 420, may estimate a response latency (e.g., cycle time) for executing a read command for a load instruction and/or for executing a write command for a store instruction.

In some examples, latency estimator 420 may provide to command table 425 information regarding the estimated latency of performing the data staging command. In some cases, latency estimator 420 may provide information regarding the data staging command to command table 425. For example, latency estimator 420 may provide command table 425 a tag of the data staging command, a command type of the data staging command (e.g., read, write), a memory address of the data staging command, the estimated latency (e.g., number of clock cycles to perform the data staging command), a buffer address associated with data of the data staging command, whether the data staging command is canceled, and/or whether the data staging command is completed. Accordingly, the storage device may add an entry to command table 425 for the data staging command.

In some examples, the storage device, in conjunction with scheduler 430 and command table 425, may schedule the data staging command (e.g., schedule a read command, schedule a write command). In some cases, the scheduling of the data staging command may be based on a further storage component (e.g., NAND component, NAND layer, translation layer). For example, the storage device may manage the interaction between the host and the storage device regarding the data staging command, translating logical addresses from the operating system into physical addresses on the storage medium of the storage device (e.g., on a NAND chip of the storage device).

In some examples, the storage device, via data buffer 435, may buffer data associated with the data staging command. In some cases, when the data staging command is a read command, then the storage device may provide the fetched data in data buffer 435, making the data available for the application of the host. In some cases, when the data staging command is a write command, then the storage device may allocate space in data buffer 435 for write data from the application of the host.

In some examples, the storage device may set a completion bit for the data staging command based on the read data being provided in data buffer 435 and/or based on the space being allocated to data buffer 435 for write data. For example, the storage device may set the completion bit in the entry of command table 425 for the data staging command (e.g., binary 1 signifies completion; binary 0 signifies completion pending; or vice versa).

At 440, the host may issue one or more poll commands. For example, while the data staging command is pending (e.g., after the storage device receives the data staging command, before the completion bit is updated to indicate the data staging command is completed), the host may poll the storage device for the status of the data staging command. In some examples, the host may issue the poll command via control address space 415. In some cases, the storage device may provide a completion status based on the poll command. For example, the storage device may provide a completion bitmap to the host based on the poll command. Additionally, or alternatively, the storage device may provide a latency status to the host based on the poll command. In some examples, the storage device may provide a lowest latency (e.g., lowest estimated clock cycle time; a lowest estimated latency of a data staging command pending in command table 425) to the host in response to the poll command. For example, the storage device may indicate a lowest latency among the latencies of multiple pending data staging commands and the command tag having the lowest latency (e.g., identifier of the data staging command with the lowest latency at the time of the storage device receiving that given poll command). In some cases, the host may continue polling the storage device (e.g., polling command table 425) via poll commands until the host determines the data staging command (e.g., at least one data staging command) based on the completion bitmap.

At 445, the host may send a cancel command to the storage device. For example, the host may cancel a data staging command pending completion based on sending a cancel command to the storage device (e.g., based on an application error, application failure). In some cases, when the host detects an application error, exception, or failure, the host may optionally issue a cancel command. The cancel command may include a tag associated with a data staging command. A given cancel command may cancel at least one data staging command (e.g., may include at least one tag). In some examples, the host may issue the cancel command via control address space 415.

At 450, the host (e.g., application of the host, operating system (OS)) may issue a load instruction and/or a store instruction to the storage device. In some cases, the load instruction/store instruction may be from a processor of the host. In some cases, a processor may issue a load/store instruction to access memory. Based on the systems and methods described, before the load/store instruction, the data or allocation for data is made available in data buffer 435. The processor can read the data located at data buffer 435 or write data to the allocation at data buffer 435 based on the data staging command. In some cases, the data may be stored at or the data may be written to a buffer address of data buffer 435. In some cases, the entry of the data staging command in command table 425 may include the buffer address.

In some implementations, the storage device may transfer data in data buffer 435 to physical interface 460 based on receiving a load instruction from the host (e.g., application of the host, OS, machine 105). For example, based on the load instruction, the host may access the data of the load instruction based on the storage device transferring the data from data buffer 435 to physical interface 460. Additionally, or alternatively, the storage device may transfer data from physical interface 460 to data buffer 435 based on the host sending the storage device a store instruction. For example, based on the store instruction, the storage device may access the data of the store instruction based on the host transferring the data to physical interface 460.

In some cases, the host may provide the load instruction and/or storage instruction via a data address space of the host (e.g., data address space 455). The data address space (e.g., different from the control address space of the host) may refer to a range of memory addresses (e.g., a portion of host address space) allocated for storing data within a given system. The data address space may include memory space, where a program (e.g., the application that issued the load instruction at 440) can access and manipulate its data. In some cases, the host may manage data address space. In some cases, the data buffer 435 may be accessed via the data address space.

Based on the systems and methods described, data may be provided by data buffer 435 to the OS/application of the host in compliance with DRAM latency constraints based on the storage device providing the data in data buffer 435 based on a load command from the application. Similarly, data may be provided to data buffer 435 by the application of the host in compliance with DRAM latency constraints based on the storage device allocating space in data buffer 435 based on a store command from the application.

Based on data staging commands, the systems and methods mask the latency of the storage device (e.g., the latency of a NAND storage device). In some cases, a given data staging command and/or poll command may occur before the load/store command from the host. Accordingly, the data is ready for the host before the host requests it. When loading data based on a load instruction, the host may load the data added to data buffer 435 based on a data staging read command. When storing data based on a store instruction, the host may store the data to the data buffer 435 in the allocated memory space created based on a data staging write command.

FIG. 5 illustrates an example data structure 500 in accordance with one or more implementations as described herein. In some configurations, one or more aspects of data structure 500 may be implemented by or in conjunction with memory controller 125 of FIG. 1, memory controller 125 of FIG. 2, memory controller 310, and/or NAND controller 325 of FIG. 3. In some configurations, one or more aspects of data structure 500 may be implemented by or in conjunction with machine 105, components of machine 105, or any combination thereof.

In the illustrated example, data structure 500 may depict response time parameters (e.g., wide-IO NAND response time parameters) for data staging commands. In some cases, the response time parameters of data structure 500 may be associated with command table 425 (e.g., response time parameters, latency parameters, cycle time parameters, etc.). As shown, data structure 500 may include one or more parameters (e.g., latency 505, operation 510). In some cases, the operation parameters of operation 510 may be associated with data staging commands (e.g., NAND read with a data staging read command, NAND program with a data staging write command, etc.).

As shown, latency 505 may include a latency parameter that is associated with a particular operation parameter of operation 510. For example, read time (tR) may be associated with a NAND read operation; program time (tProg) may be associated with a NAND program operation; block erase time (tBERS) may be associated with a NAND erase operation; read count (e.g., ReadCnt of a channel, chip, die, plane) may be associated with a queued read count of a plane operation; write count (e.g., EraseCnt of a channel, chip, die, plane) may be associated with a queued write count of a plane operation; erase count (e.g., EraseCnt of a channel, chip, die, plane) may be associated with a queued erase count of a plane operation; running type (e.g., RunningIO-Type of a channel, chip, die, plane) may be associated with a running IO type (e.g., read, write, erase) operation of a plane; IO start cycle (e.g., IOStartCycle of a channel, chip, die, plane) may be associated with a running IO start clock cycle operation of a plane.

It is noted that some response time parameters (e.g., wide-IO NAND response time parameters) may have a predefined latency or known expected latency (e.g., predefined number of clock cycles, known expected number of clock cycles). For example, tR may have known expected read latency, tProg may have a known expected program latency, tBERS may have a known expected erase latency, etc. In some cases, one or more response time parameters may have a dynamic latency that depends on system capacity, system load, etc. For example, ReadCnt, WriteCnt, EraseCnt, RunningIOType, and/or IOStartCycle may have dynamic latency.

Poll commands can be computationally expensive. Accordingly, indicating the expected latency based on the response latency estimator can reduce the use of the poll command. For example, the poll command frequency may be adjusted (e.g., relaxed, increased, based on the expected time of completion).

In some cases, in response to a poll command, the storage device may provide a lowest latency (e.g., the lowest latency among commands pending completion) and/or a completion bitmap. In some cases, the completion bitmap may indicate a completion status for one or more commands (e.g., one or more command pending completion). In some cases, the completion bitmap may include binary values (e.g., 1 indicates completed; 0 indicates incomplete; or vice versa). The completion bitmap may include a set of binary values where a least significant bit may indicate a completion status of a first command (e.g., oldest command or most recent command) and a most significant bit may indicate a completion status of an Nth command of N commands (e.g., most recent command or oldest command), where N is a positive integer. If a situation occurs where there are no commands, then the complete bitmap may be empty (e.g., null value).

As an application polls a command table, the application may issue a load instruction or store instruction based on the completion bitmap. For example, when the host determines that a completion bit for a DI command has switched from incomplete to complete, based on this determination, an application of the host may issue a load/store instruction for that completed command (e.g., load instruction for completed read command; store instruction for completed write command, etc.).

In some examples, as, e.g., an application issues a data staging read command, write command, and/or erase command, the count of queued reads may increase (e.g., dynamically increasing respective latency). In some cases, as the storage device completes a read command, write command, or erase command, the count of queued reads may decrease (e.g., dynamic decrease in latency).

In some cases, RunningIOType may indicate what type of command is running on the storage device (e.g., read, write, erase, etc.). IOStartCycle may indicate the start clock cycle (e.g., a temporal frame of reference for estimated latency). Based on the running IO type, if a write command, then executing the write command will take an indicated time to execute.

In some cases, the running IO start clock cycle may indicate how long a given running IO type has been running on a given NAND. For example, a write command may be running on the NAND, and if the running IO start clock cycle indicates the write command has been running for a relatively long time, the response latency estimator may compensate that running time (e.g., longer-than-expected running time). Accordingly, response latency estimator may adjust (e.g., increase, decrease) the response latency based on the running IO start clock cycle.

FIG. 6 depicts a flow diagram illustrating an example data structure 600 associated with the disclosed systems, in accordance with example implementations described herein. In some configurations, one or more aspects of data structure 600 may be implemented by or in conjunction with memory controller 125 of FIG. 1, memory controller 125 of FIG. 2, memory controller 310, and/or NAND controller 325 of FIG. 3. In some configurations, one or more aspects of data structure 600 may be implemented by or in conjunction with machine 105, components of machine 105, or any combination thereof. The depicted data structure 600 is just one implementation and one or more operations of data structure 600 may be rearranged, reordered, omitted, and/or otherwise modified such that other implementations are possible and contemplated.

In the illustrated example, data structure 600 may depict aspects of a command table (e.g., command table 425). As shown, data structure 600 may include one or more fields. The one or more fields may include at least one of tag 605, command 610, address 615, cycle 620, buffer address 625, cancel 630, and completion bit 635.

In some examples, an entry of a command table may include one or more fields of data structure 600. For example, an entry of a command table may be for a data staging command received by a storage device. When the storage device receives a data staging command from the host, the storage device may store information regarding the data staging command in the command table (e.g., in a format based on data structure 600). For example, an entry of the command table may include a tag value (e.g., tag 605, decimal tag value, binary tag value, etc.), a command type value (e.g., command 610), a cycle value (e.g., cycle 620, an estimated number of cycles to execute the command, an estimated latency), a buffer address (e.g., buffer address 625, buffer address of data buffer 435) where read data may be stored or where write data may be written, a cancel value (e.g., cancel 630) indicating whether the command is canceled (e.g., binary 0 indicates not canceled; binary 1 indicates canceled; or vice versa), and a completion bit (e.g., completion bit 635) indicating whether the command is completed.

In some examples, a command table may indicate a tag associated with a command (e.g., tag 605). When a command is canceled or otherwise operated on, the command may be canceled based on a tag. For example, a given command may be assigned a tag. When the host or storage device determines to cancel the command, the command may be identified based on its tag and NAND controller 325 may then cancel the identified command.

In some examples, a command table may indicate an address (e.g., address 615) associated with a command type. For example, the command table may indicate an addressable location in NAND where data is read from or written to, or erased, based on a data staging command. In some examples, the storage device may use a DRAM address from the DRAM command to look up the buffer address in the command table (e.g., based on receiving a load/store instruction). In some cases, the host may include the DRAM address in the data staging command. In some cases, an entry for a data staging command stored in the command table may include the DRAM address. In some cases, the storage device may translate the DRAM address to a NAND address (e.g., from an address of DRAM 315 to an address of NAND 320). For example, a data staging read command may include a DRAM address that is translated to a NAND address (e.g., via NAND controller 325). Data may be read from the NAND at the NAND address and stored in a data buffer (e.g., data buffer 435) at a buffer address. When the storage device receives a load instruction, the read data in the data buffer may be provided to the host (e.g., to an application of the host). In some examples, a data staging write command may include a DRAM address that is translated to a NAND address. When the storage device receives a store instruction, data may be received from the host (e.g., from an application of the host) and stored in the data buffer at the buffer address. The data in the data buffer may be moved or copied to the NAND at the NAND address.

In some examples, a command table may indicate a cycle time (e.g., cycle 620). Cycle time may indicate how many cycles a command may take to complete. In some cases, a latency estimator (e.g., latency estimator 420) may estimate a number of cycles it will take to complete a given command. In some cases, an estimated latency determined by the latency estimator may be based on the estimated number of cycles.

In some examples, a command table may indicate a buffer address (buffer address 625) associated with providing data for a load instruction and/or allocating space for a store instruction in a data buffer (e.g., data buffer 435). The command table may indicate whether a command is canceled (e.g., is being canceled, is canceled, has been canceled) via cancel 630. The command table may indicate a completion bit (e.g., completion bit 635), which may indicate whether a given command is completed.

Figure 7:
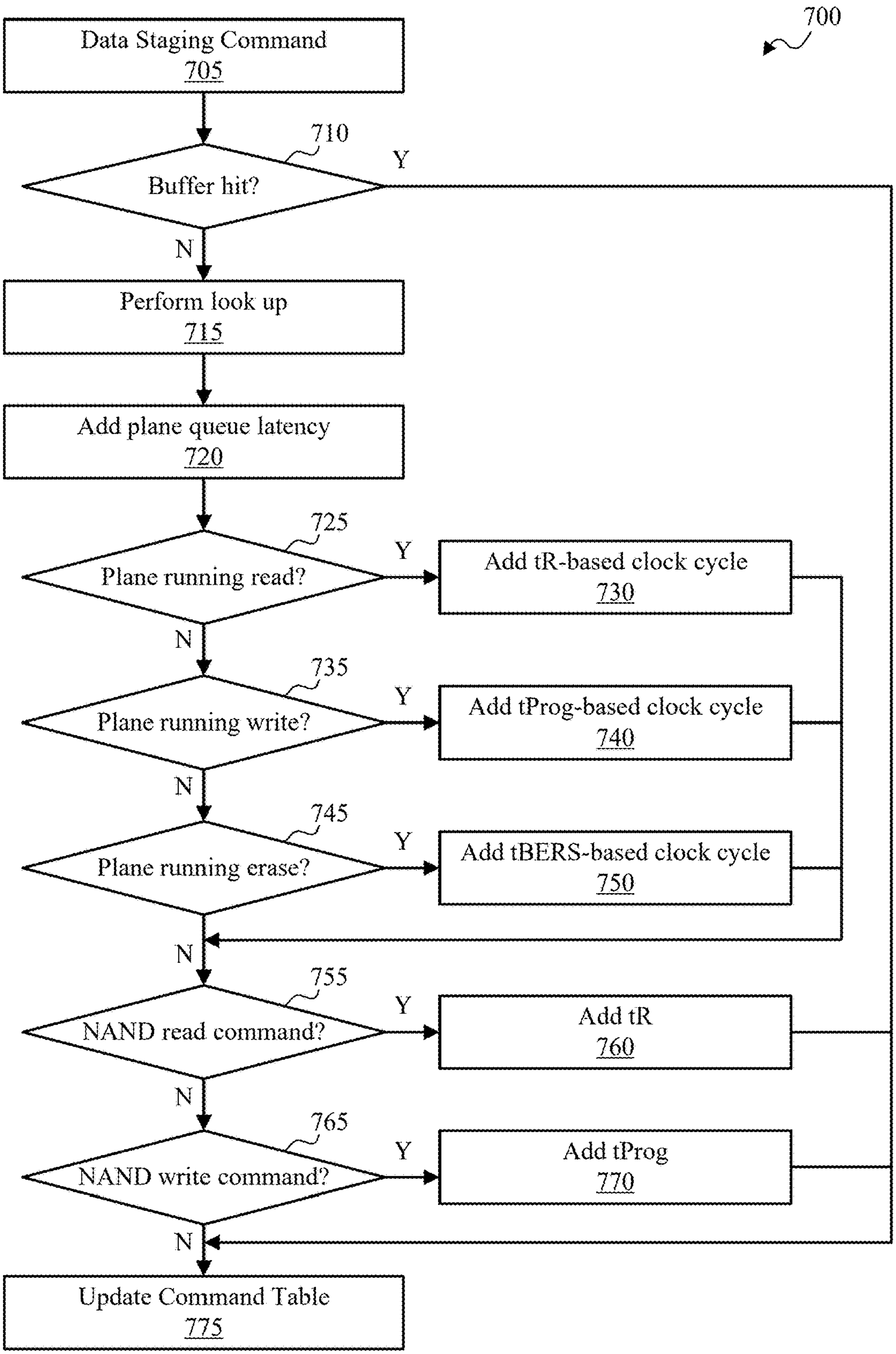
FIG. 7 depicts a flow diagram illustrating an example method associated with the disclosed systems, in accordance with example implementations described herein.

FIG. 7 depicts a flow diagram illustrating an example method 700 associated with the disclosed systems, in accordance with example implementations described herein. In some configurations, one or more aspects of method 700 may be implemented by or in conjunction with memory controller 125 of FIG. 1, memory controller 125 of FIG. 2, memory controller 310, and/or NAND controller 325 of FIG. 3. In some configurations, one or more aspects of method 700 may be implemented by or in conjunction with machine 105, components of machine 105, or any combination thereof. The depicted method 700 is just one implementation and one or more operations of method 700 may be rearranged, reordered, omitted, and/or otherwise modified such that other implementations are possible and contemplated.

At 705, method 700 may include receiving a data staging command. For example, a storage drive (e.g., wide-IO NAND device, NAND controller 325) may receive from a host a data staging command that is configured to stage data for a load instruction of an application of the host, or stage an allocation for a store instruction of the application. In some cases, the data staging command may include a read command, a write command, erase command, etc. For example, the data staging command may include one or more NAND read commands and/or one or more NAND write commands, etc., that the host sends the storage device to stage data for a load instruction and/or to stage an allocation for a store instruction from an application of the host.

At 710, method 700 may include determining whether a buffer hit occurs. For example, the storage device may determine whether a buffer hit occurs based on the data staging command. At 775, when the storage device determines a buffer hit occurs based on the data staging command, the storage device may update a command table (e.g., command table 425). For example, the storage device may update a latency associated with the data staging command.

At 715, method 700 may include performing a lookup. For example, when the storage device determines no buffer hit occurs, the storage device may look up (e.g., from L2P table) a channel, chip, die, and/or plane ID associated with the data staging command.

At 720, method 700 may include adding plane queue latency. For example, the storage device may add plane queue latency (e.g., based on the look up at 715) to an estimated latency for the data staging command at 705. In some cases, the plane queue latency may be based on read count, read time, write count, write time, erase count, and/or erase time. For example, in some cases, the plane queue latency may be based on the following equation: readCnt*tR+WriteCnt*tProg+EraseCnt*tBERS.

At 725, method 700 may include determining whether the plane is running a read command. For example, the storage device may determine whether the plane is running a read command (e.g., the data staging command).

At 730, method 700 may include adding a read time. For example, when the storage device determines the plane is running a read command, the storage device may add a read time (e.g., tR-based clock cycle) to the estimated latency for the data staging command at 705. In some cases, the method 700 may then proceed to 755. In some cases, adding the read time may be based on a read time, IO start cycle, and/or clock cycle. For example, in some cases, the read time that is added may be based on the following equation: read time added=tR−(IOStart Cycle−Clock Cycle). In some cases, NAND controller 325 may implement a clock (e.g., timer 155) for IO start cycle and/or IO end cycle, which may be used for the running IO start clock cycle. In some cases, the clock may be implemented in and/or managed by NAND controller 325.

At 735, method 700 may include determining whether the plane is running a write command. For example, when the storage device determines the plane is not running a read command, the storage device may determine whether the plane is running a write command (e.g., the data staging command).

At 740, method 700 may include adding a write time. For example, when the storage device determines the plane is running a write command, the storage device may add a write time (e.g., tProg-based clock cycle) to the estimated latency. In some cases, the method 700 may then proceed to 755. In some cases, adding the write time may be based on a read time, IO start cycle, and/or clock cycle. For example, in some cases, the read time that is added may be based on the following equation: write time added=tProg−(IOStart Cycle−Clock Cycle).

At 745, method 700 may include determining whether the plane is running an erase command. For example, when the storage device determines the plane is not running a write command, the storage device may determine whether the plane is running an erase command (e.g., the data staging command).

At 750, method 700 may include adding an erase time. For example, when the storage device determines the plane is running an erase command, the storage device may add an erase time (e.g., tBERS-based clock cycle) to the estimated latency. In some cases, the method 700 may then proceed to 755.

In some cases, adding the erase time may be based on an erase time, IO start cycle, and/or clock cycle. For example, in some cases, the erase time that is added may be based on the following equation: erase time added=tBERS−(IOStart Cycle−Clock Cycle).

At 755, method 700 may include determining whether the data staging command is a NAND read command. For example, when the storage device determines the plane is not running an erase command, the storage device may determine whether the data staging command is a NAND read command.

At 760, method 700 may include adding a read time. For example, when the storage device determines the data staging command is a NAND read command, the storage device may add a read time (e.g., tR-based clock cycle) to the estimated latency. In some cases, the method 700 may then proceed to 775. For example, the storage device may update the command table (e.g., based on adding the plane queue latency and/or adding the read time).

At 765, method 700 may include determining whether the data staging command is a NAND write command. For example, when the storage device determines the data staging command is not a NAND read command, the storage device may determine whether the data staging command is a NAND write command.

At 770, method 700 may include adding a write time. For example, when the storage device determines the data staging command is a NAND write command, the storage device may add a write time (e.g., tProg-based clock cycle) to the estimated latency. (e.g., based on adding the plane queue latency and/or adding the write time).

At 775, method 700 may include updating a command table. For example, when the storage device determines the data staging command is not a NAND write command, the storage device may update the command table accordingly (e.g., based on adding the plane queue latency).

It is noted that poll commands can be computationally expensive. Accordingly, a latency estimator (e.g., latency estimator 420) can reduce the use of the poll command based on estimating and/or updating a response time latency, and providing the estimated/updated response time latency to the host. The latency estimator may uses NAND latency, NAND plane queue length, and/or a NAND plane running command to estimate the response latency. The commands associated with staging the data may include read commands, write commands, poll commands, cancel commands, write data commands, etc. A write command may retrieve a buffer for a DRAM write. A write data command may convert a DRAM write to a NAND write data command sent to a next NAND component (e.g., based on an address translation layer).

Figure 8:
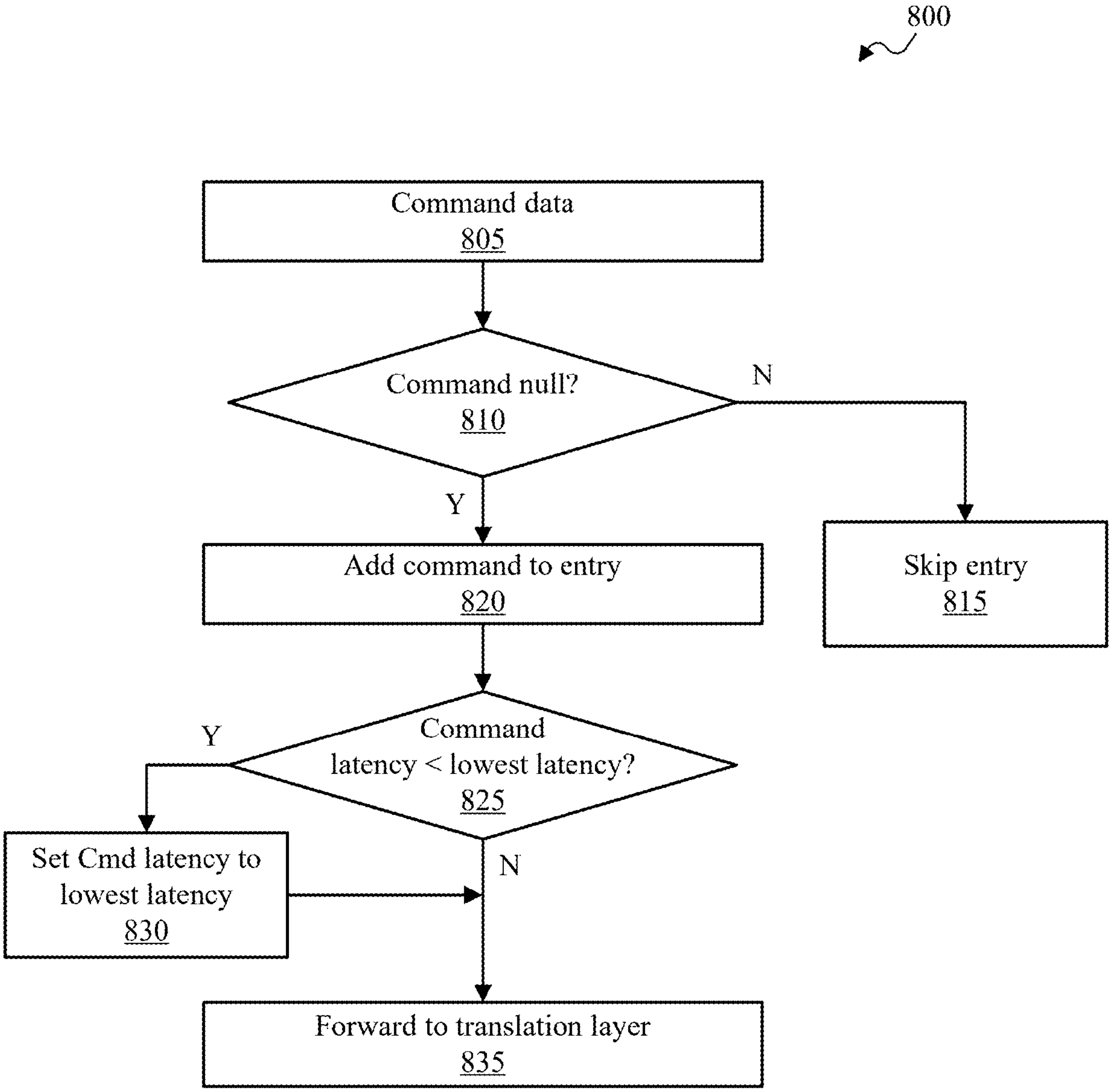
FIG. 8 depicts a flow diagram illustrating an example method associated with the disclosed systems, in accordance with example implementations described herein.

FIG. 8 depicts a flow diagram illustrating an example method 800 associated with the disclosed systems, in accordance with example implementations described herein. In some configurations, one or more aspects of method 800 may be implemented by or in conjunction with memory controller 125 of FIG. 1, memory controller 125 of FIG. 2, memory controller 310, and/or NAND controller 325 of FIG. 3. In some configurations, one or more aspects of method 800 may be implemented by or in conjunction with machine 105, components of machine 105, or any combination thereof. The depicted method 800 is just one implementation and one or more operations of method 800 may be rearranged, reordered, omitted, and/or otherwise modified such that other implementations are possible and contemplated.

At 805, method 800 may include obtaining command data. For example, a storage device may receive a data staging command (e.g., NAND read command, NAND write command, etc.). In some cases, the data staging command may include a memory address, a length, a command tag, and/or an estimated latency. In some cases, the storage device may insert the data staging command to a command table (e.g., command table 425).

At 810, method 800 may include determining whether the command is null. For example, based on the command tag, the storage device may determine whether the command is registered in the command table (e.g., command is not null, tag already in use, entry already exists in the command table for that tag), or whether the command is not registered in the command table (e.g., tag not in use). In some cases, the host may manage the command tags. For example, the host may generate a tag, assign a tag to a data staging command, dissociate a tag with a data staging command, associate a tag with a load instruction, associate a tag with a store instruction, etc.

At 815, method 800 may include skipping entering the command. For example, when the storage device determines that the command is not null (e.g., tag already in use by that command or another command), then the storage device may skip entering or reentering that command in the command table.

At 820, method 800 may include adding the command as an entry of the command table. For example, when the storage device determines that the command is not registered in the command table (e.g., tag not in use), then the storage device may add the command as an entry of the command table.

At 825, method 800 may include determining whether the command latency is less than a lowest latency. For example, the storage device may estimate a latency for the command at 805 (e.g., command latency). The storage device may determine a lowest latency among one or more commands (e.g., the lowest latency of one or more commands pending completion).

At 830, method 800 may include setting the command latency to the lowest latency. For example, when the storage device determines that the command latency is less than the lowest latency, the method 800 may set the command latency to the lowest latency.

At 835, method 800 may include forwarding the command to a translation layer of the storage device (e.g., for processing of the command). For example, when the storage device determines that the command latency is not less than the lowest latency (e.g., greater than or equal to the lowest latency), the method 800 may forward the command to the translation layer.

Figure 9A:
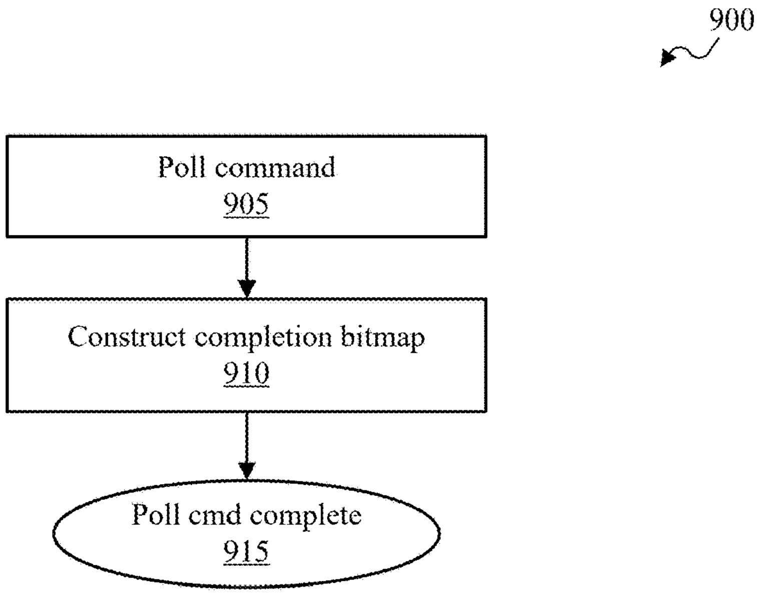
FIGS. 9A and 9B depict flow diagrams illustrating example methods associated with the disclosed systems, in accordance with example implementations described herein.

FIG. 9A depicts a flow diagram illustrating an example method 900 associated with the disclosed systems, in accordance with example implementations described herein. In some configurations, one or more aspects of method 900 may be implemented by or in conjunction with memory controller 125 of FIG. 1, memory controller 125 of FIG. 2, memory controller 310, and/or NAND controller 325 of FIG. 3. In some configurations, one or more aspects of method 900 may be implemented by or in conjunction with machine 105, components of machine 105, or any combination thereof. The depicted method 900 is just one implementation and one or more operations of method 900 may be rearranged, reordered, omitted, and/or otherwise modified such that other implementations are possible and contemplated.

At 905, method 900 may include receiving a poll command. For example, a storage device may receive a poll command from a host. In some cases, the host may issue a poll command to request the status of a data staging command.

At 910, method 900 may include constructing a completion bitmap. For example, the storage device may construct a completion bitmap based on receiving a poll command from the host and provide the completion bitmap in a reply message. In some cases, the completion bitmap may indicate a completion status for one or more data staging commands.

For example, the completion bitmap may indicate the completion status sequentially for N data staging commands, from a first data staging command with command tag 0 up to a last data staging command with command tag N (e.g., least significant bit for Tag 0 to most significant bit for Tag N). In some cases, the storage device may construct a completion bitmap for or based on a buffer ID (e.g., an identifier of a buffer such as data buffer 435). In some cases, the storage device may include a lowest command latency (e.g., lowest latency, lowest cycle time) in the reply message. In some cases, the storage device may include a command tag associated with the lowest command latency.

At 915, method 900 may include completing the poll command. For example, the storage device may send the reply message to the host. In some cases, the storage device may indicate that the poll command is complete (e.g., in a command completion queue).

Figure 9B:
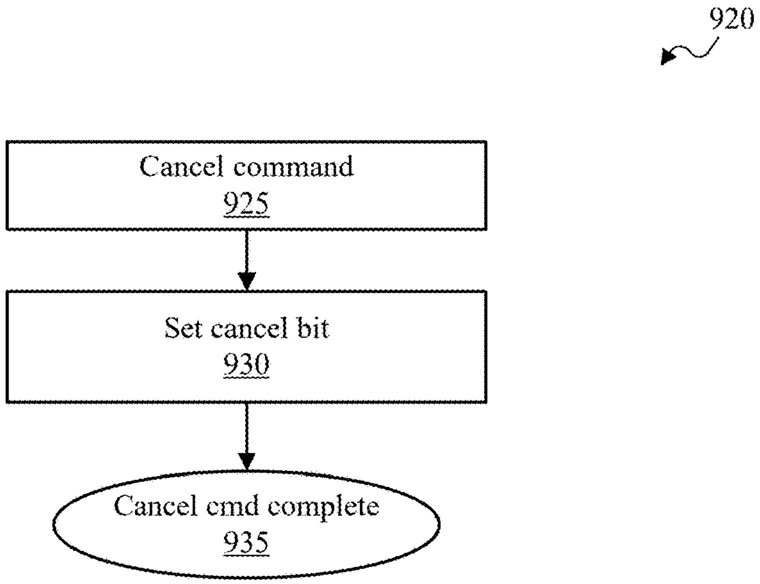

FIG. 9B depicts a flow diagram illustrating an example method 920 associated with the disclosed systems, in accordance with example implementations described herein. In some configurations, one or more aspects of method 920 may be implemented by or in conjunction with memory controller 125 of FIG. 1, memory controller 125 of FIG. 2, memory controller 310, and/or NAND controller 325 of FIG. 3. In some configurations, one or more aspects of method 920 may be implemented by or in conjunction with machine 105, components of machine 105, or any combination thereof. The depicted method 920 is just one implementation and one or more operations of method 920 may be rearranged, reordered, omitted, and/or otherwise modified such that other implementations are possible and contemplated.

At 925, method 920 may include receiving a cancel command. For example, a storage device may receive a cancel command from a host. In some cases, the host may issue a cancel command to request cancellation of a data staging command.

At 930, method 920 may include setting a cancel bit. For example, the storage device may set a cancel bit in a command table. In some cases, the cancel command may include a command tag. The storage device may query the command table for a match to the provided command tag to identify a data staging command associated with the cancel command.

At 935, method 900 may include completing the cancel command. For example, upon identifying an entry that includes the command tag, the storage device may cancel execution of the data staging command. In some cases, the storage device may indicate that the cancel command is complete (e.g., via the cancel bit).

Figure 10:
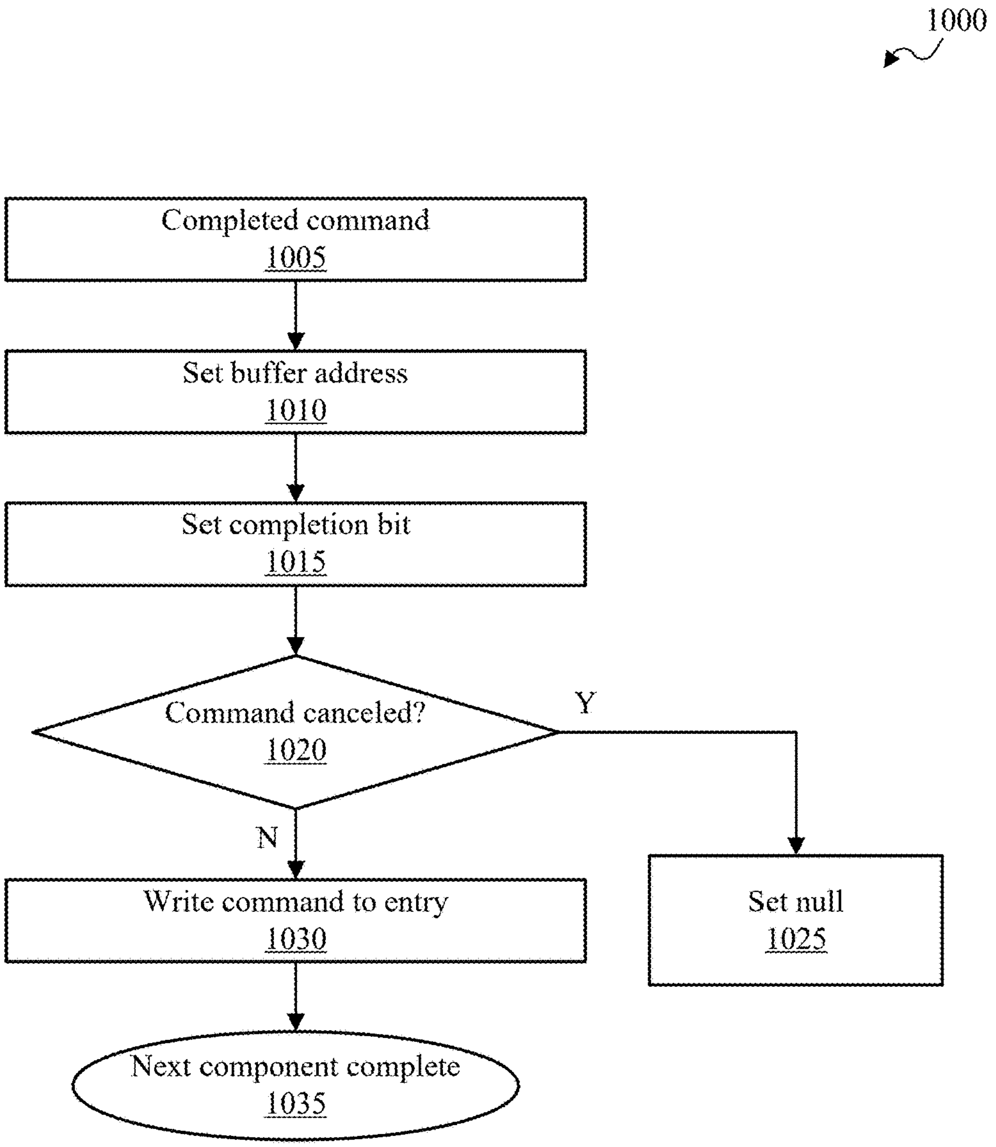
FIG. 10 depicts a flow diagram illustrating an example method associated with the disclosed systems, in accordance with example implementations described herein.

FIG. 10 depicts a flow diagram illustrating an example method 1000 associated with the disclosed systems, in accordance with example implementations described herein. In some configurations, one or more aspects of method 1000 may be implemented by or in conjunction with memory controller 125 of FIG. 1, memory controller 125 of FIG. 2, memory controller 310, and/or NAND controller 325 of FIG. 3. In some configurations, one or more aspects of method 1000 may be implemented by or in conjunction with machine 105, components of machine 105, or any combination thereof. The depicted method 1000 is just one implementation and one or more operations of method 1000 may be rearranged, reordered, omitted, and/or otherwise modified such that other implementations are possible and contemplated.

At 1005, method 1000 may include completing a command. For example, a storage device may complete a data staging command received from a host. The completed command may be associated with a command type, an address associated with reading or writing data, a length of a memory region (e.g., a length of data to read), a command tag, and/or a buffer address.

At 1010, method 1000 may include setting a buffer address. For example, the storage device may determine an address where the data of the data staging command is stored in a buffer. The data storage device may store the buffer address in an entry of a command table.

At 1015, method 1000 may include setting a completion bit. For example, the storage device may set the completion bit to indicate the data staging command is completed (e,g. in the entry of the command table).

At 1020, method 1000 may include determining whether the data staging command is canceled. For example, the storage device may determine whether the data staging command is canceled. In some cases, the storage device may query the command table (e.g., based on command tag) to determine whether the data staging command is canceled.

At 1025, method 1000 may include setting an entry null in the command table. For example, the storage device may set an entry in the command table associated with the data staging command to null when the storage device determines the data staging command is canceled. In some cases, a null entry may be used by another command (e.g., a new command). For example, a null entry may indicate the entry is available to hold information for another command. In some cases, the null entry may retain an association with a command tag and the command tag of that entry may be assigned by the host to another command.

At 1030, method 1000 may include writing a command to an entry. For example, when the storage device determines the data staging command is not canceled, the storage device may store the data staging command (e.g., information associated with the data staging command) in the entry of the command table (e.g., including the completion bit, cancellation bit, etc.).

At 1035, method 1000 may include marking a next component complete. For example, the storage device may indicate a NAND component associated with the data staging command as complete.

Figure 11:
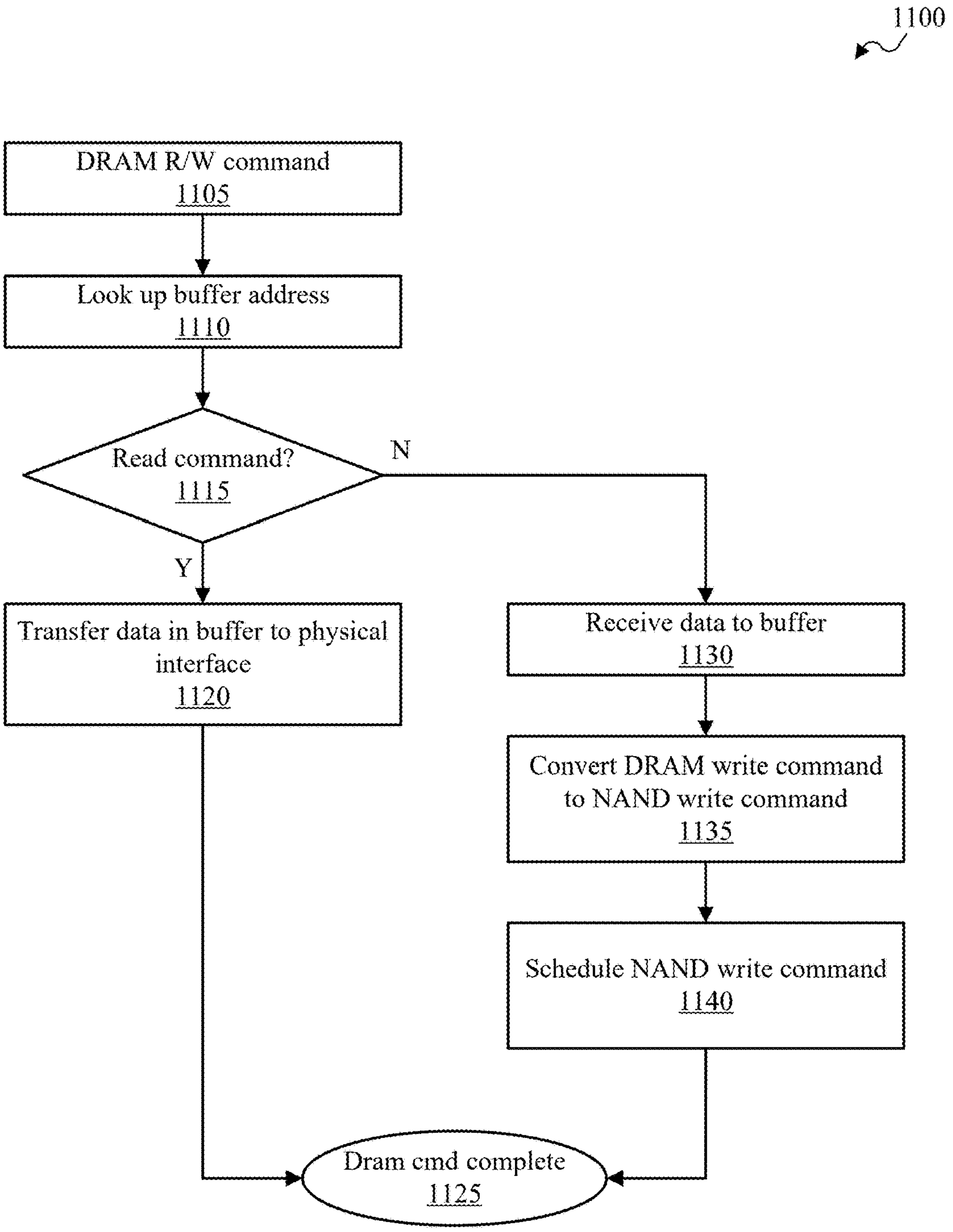
FIG. 11 depicts a flow diagram illustrating an example method associated with the disclosed systems, in accordance with example implementations described herein.

FIG. 11 depicts a flow diagram illustrating an example method 1100 associated with the disclosed systems, in accordance with example implementations described herein. In some configurations, one or more aspects of method 1100 may be implemented by or in conjunction with memory controller 125 of FIG. 1, memory controller 125 of FIG. 2, memory controller 310, and/or NAND controller 325 of FIG. 3. In some configurations, one or more aspects of method 1100 may be implemented by or in conjunction with machine 105, components of machine 105, or any combination thereof. The depicted method 1100 is just one implementation and one or more operations of method 1100 may be rearranged, reordered, omitted, and/or otherwise modified such that other implementations are possible and contemplated.

At 1105, method 1100 may include receiving a DRAM command. For example, a storage device may receive a load instruction (e.g., DRAM read) and/or a store instruction (e.g., DRAM write) from the host. A DRAM read or DRAM write may be completed based on data in a data buffer. The DRAM command may be associated with a DRAM command address (e.g., Channel, Rank, Bank, Row, Column).

At 1110, method 1100 may include looking up a buffer address. For example, the storage device may query a command table for a buffer address associated with the DRAM command. In some cases, the DRAM command may be associated with a command tag. The storage device may query the command table for a command tag associated with the DRAM command, identify an entry that includes the command tag, and identify a buffer address associated with the command tag. A DRAM read command may be processed based on data stored in a data buffer at the buffer address. A DRAM write command may be processed based on storing data in the data buffer at the buffer address. In some examples, the storage device may use a DRAM address from the DRAM command to look up the buffer address from the command table. In some cases, the host may include the DRAM address in the data staging command sent to the storage device. An entry of a data staging command stored in the command table may include the DRAM address. In some cases, the storage device may translate the DRAM address to a NAND address.

At 1115, method 1100 may include determining whether the DRAM command is a DRAM read command. For example, the storage device may parse the DRAM command to determine whether the DRAM command is a DRAM read command or a DRAM write command.

At 1120, method 1100 may include transferring data in the data buffer to a physical interface (e.g., physical interface 345*a*, physical interface 345*b*, physical interface 460, DRAM physical interface). For example, when the storage device determines that the DRAM command is a DRAM read command, the storage device may transfer data in the data buffer to a DRAM physical interface.

At 1125, method 1100 may include complete the DRAM command. For example, the DRAM command may be completed based on the storage device providing the data in the data buffer to the physical interface of the DRAM.

At 1130, method 1100 may include receive data to buffer. For example, when the storage device determines the DRAM command is a DRAM write command (e.g., not a DRAM read command), the storage device may receive data from the DRAM physical interface to store in the data buffer.

At 1135, method 1100 may include convert the DRAM write command to a NAND write command. For example, the storage device may convert the DRAM write command to a NAND write command.

At 1140, method 1100 may include scheduling the NAND write command. For example, the storage device may schedule the NAND write command to write the data in the buffer to NAND of the storage device. The DRAM command may be completed based on the storage device scheduling the NAND write command and/or writing the data in the buffer to NAND of the storage device.

Figure 12:
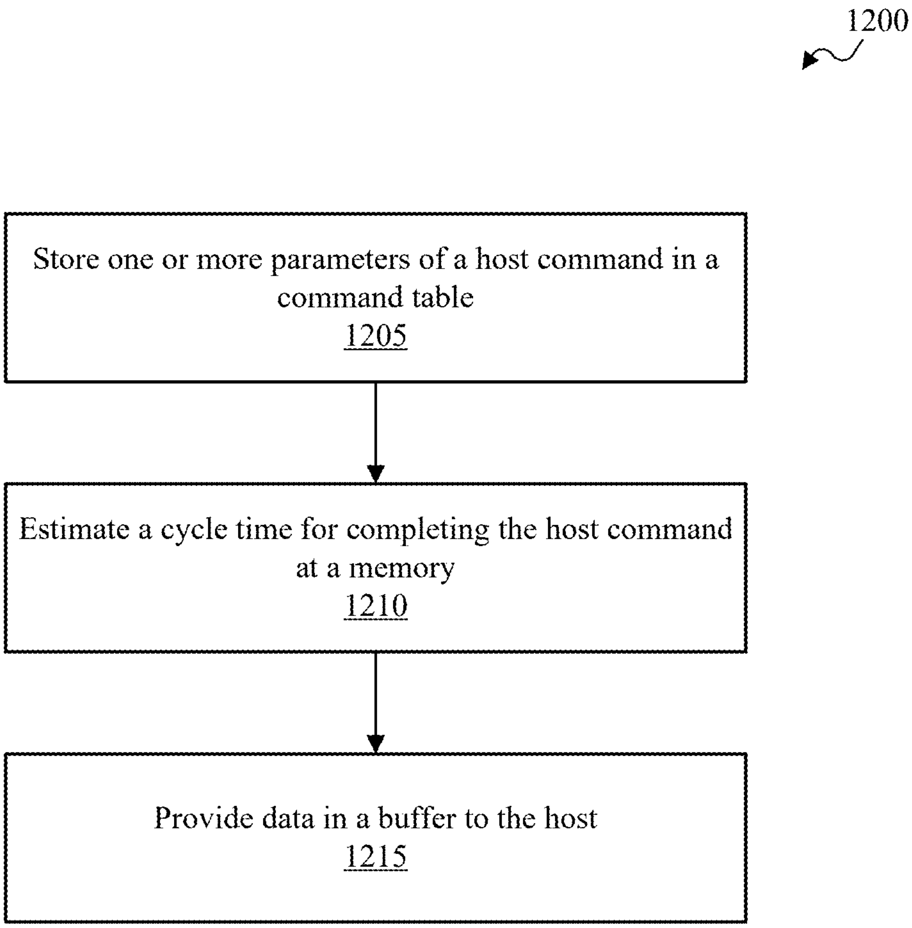
FIG. 12 depicts a flow diagram illustrating an example method associated with the disclosed systems, in accordance with example implementations described herein.

FIG. 12 depicts a flow diagram illustrating an example method 1200 associated with the disclosed systems, in accordance with example implementations described herein. In some configurations, one or more aspects of method 1200 may be implemented by or in conjunction with memory controller 125 of FIG. 1, memory controller 125 of FIG. 2, memory controller 310, and/or NAND controller 325 of FIG. 3. In some configurations, one or more aspects of method 1200 may be implemented by or in conjunction with machine 105, components of machine 105, or any combination thereof. The depicted method 1200 is just one implementation and one or more operations of method 1200 may be rearranged, reordered, omitted, and/or otherwise modified such that other implementations are possible and contemplated.

At 1205, method 1200 may include storing one or more parameters of a host command (e.g., data staging command) in a command table. For example, a storage device may store one or more parameters of a host command in a command table based on receiving, from a host, a host command for a memory of the memory module. In some cases, the memory module may include a first ranked memory (e.g., DRAM memory) and the memory (e.g., NAND memory; wide-IO NAND memory).

At 1210, method 1200 may include estimating a cycle time for completing the host command at a memory. For example, a storage device may estimate a cycle time for completing the host command at the memory.

At 1215, method 1200 may include providing data in a buffer to the host. For example, a storage device may provide, via the memory of the memory module, data in a buffer of the memory module to the host. The data may be stored in the buffer based on the memory completing the host command.

Figure 13:
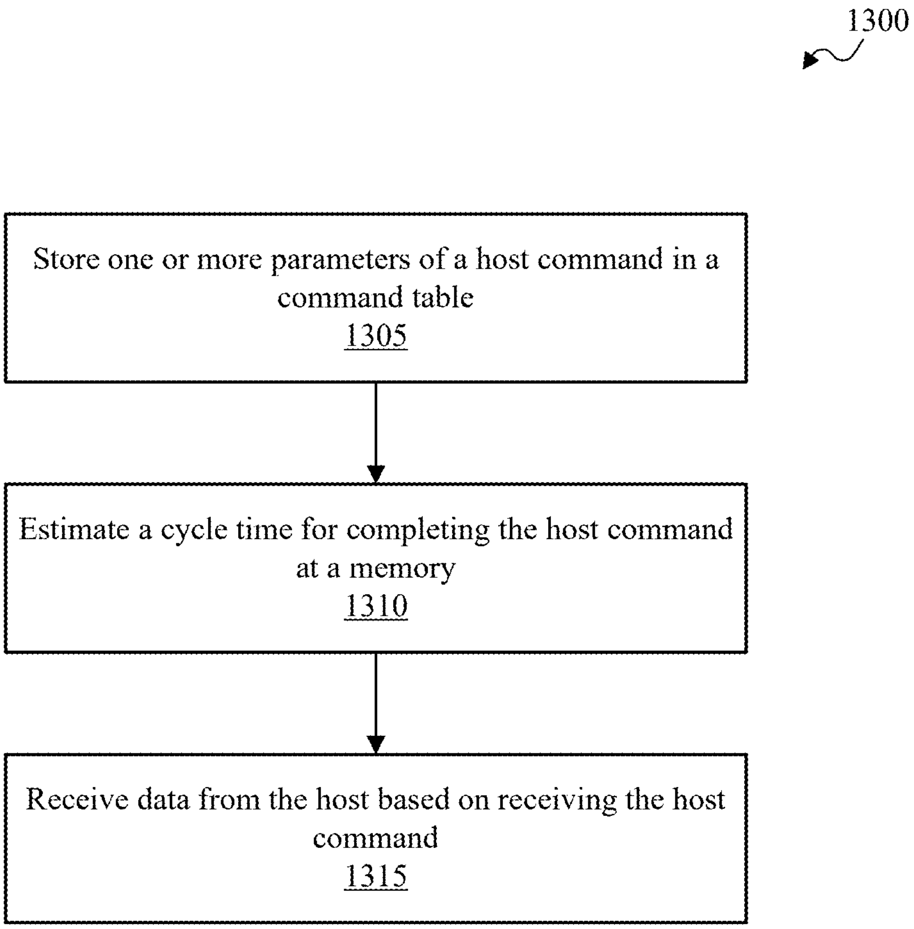
FIG. 13 depicts a flow diagram illustrating an example method associated with the disclosed systems, in accordance with example implementations described herein.

FIG. 13 depicts a flow diagram illustrating an example method 1300 associated with the disclosed systems, in accordance with example implementations described herein. In some configurations, one or more aspects of method 1300 may be implemented by or in conjunction with memory controller 125 of FIG. 1, memory controller 125 of FIG. 2, memory controller 310, and/or NAND controller 325 of FIG. 3. In some configurations, one or more aspects of method 1300 may be implemented by or in conjunction with machine 105, components of machine 105, or any combination thereof. The depicted method 1300 is just one implementation and one or more operations of method 1300 may be rearranged, reordered, omitted, and/or otherwise modified such that other implementations are possible and contemplated.

At 1305, method 1300 may include storing one or more parameters of a host command in a command table. For example, a storage device may store one or more parameters of a host command in a command table based on receiving, from a host, a host command for a memory of a memory module (e.g., a second ranked memory). In some cases, the memory module may include a first ranked memory (e.g., DRAM memory) and a second ranked memory (e.g., NAND memory; wide-IO NAND memory).

At 1310, method 1300 may include estimating a cycle time for completing the host command at the memory. For example, a storage device may estimate a cycle time for completing the host command at the memory (e.g., NAND 320).

At 1315, method 1300 may include receiving data from the host based on receiving the host command. For example, a storage device may receive, via a physical interface of the memory of the memory module, data from the host based on receiving the host command, the data being stored in a memory region of a buffer of the memory module (e.g., data buffer 340).

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wired and/or wireless communication device such as a switch, router, network interface controller, cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be wireless, wired, mobile, and/or stationary.

As used within this document, the term "communicate" is intended to include transmitting, or receiving, or both transmitting and receiving. Similarly, the bidirectional exchange of data between two devices (both devices transmit and receive during the exchange) may be described as 'communicating', when only the functionality of one of those devices is being claimed. The term "communicating" as used herein with respect to wired and/or wireless communication signals includes transmitting the wired and/or wireless communication signals and/or receiving the wired and/or wireless communication signals. For example, a communication unit, which is capable of communicating wired and/or wireless communication signals, may include a wired/wireless transmitter to transmit communication signals to at least one other communication unit, and/or a wired/wireless communication receiver to receive the communication signal from at least one other communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Arca Network (WVAN), a Local Area Network (LAN), a Wireless LAN (WLAN), a Personal Arca Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples as set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of data staging for a memory module comprising memory, the method comprising:

storing one or more parameters of a host command in a command table based on receiving, from a host, the host command for the memory of the memory module;

estimating a cycle time for completing the host command at the memory; and providing, to the host via the memory of the memory module, data in a buffer of the memory module, the data being stored in the buffer based on the memory completing the host command.

2. The method of claim 1, further comprising reading, based on the host command comprising a read command, the data from a location of the memory indicated in the host command.

3. The method of claim 1, further comprising storing the data in a memory region of the buffer, wherein the memory region is associated with a buffer address included in the host command.

4. The method of claim 3, further comprising querying the command table for the buffer address based on receiving, via a data address space of the host, a load instruction from an application of the host, the load instruction being associated with the data based on a command tag that is associated with the data and the load instruction.

5. The method of claim 1, further comprising providing, in response to a poll command from the host, a status of the host command, the status comprising at least a lowest estimated latency of N milliseconds associated with a data staging command pending in the command table.

6. The method of claim 1, wherein a memory controller of the memory receives the host command via a control address space of the host.

7. The method of claim 1, wherein the one or more parameters of the host command comprise at least one of a command tag of the host command, a command type, a command address, the cycle time, a buffer address indicating a location where the data is stored in the buffer, a cancel indicator indicating a cancelation status of the host command, and a completion indicator indicating a completion status of the host command.

8. The method of claim 7, further comprising updating the completion indicator based on completing the host command.

9. The method of claim 1, wherein:

a first ranked memory of the memory module comprises dynamic random-access memory, and the memory is a second ranked memory of the memory module that comprises NAND flash memory.

10. The method of claim 9, further comprising providing the data to the host based on transferring the data from the buffer to a physical interface of the first ranked memory and the second ranked memory, wherein the second ranked memory communicates messages or data via the physical interface.

11. A method of data staging for a memory module comprising a memory, the method comprising:

storing one or more parameters of a host command in a command table based on receiving, from a host, a host command for the memory of the memory module;

estimating a cycle time for completing the host command at the memory; and receiving, from the host via a physical interface of the memory module, data based on receiving the host command, the data being stored in a memory region of a buffer of the memory module.

12. The method of claim 11, further comprising allocating the memory region of the buffer for a store instruction based on the host command comprising a write command.

13. The method of claim 11, further comprising:

receiving, via a data address space of the host, a store instruction from an application of the host; and receiving, based on the store instruction, the data, the data being received at a memory controller of the memory module from the physical interface of the memory module.

14. The method of claim 13, further comprising:

converting the store instruction to a NAND write command; and storing the data in the buffer based on scheduling the NAND write command.

15. The method of claim 11, further comprising receiving the data from the host based on the host transferring the data to the buffer via a physical interface of the memory module.

16. The method of claim 11, further comprising updating a completion indicator of the command table based on completing the host command.

17. The method of claim 11, wherein:

a first ranked memory of the memory module comprises dynamic random-access memory, and the memory is a second ranked memory of the memory module that comprises NAND flash memory.

18. A non-transitory computer-readable medium associated with a memory module comprising a memory, the non-transitory computer-readable medium storing code that comprises instructions executable by a processor to:

storing one or more parameters of a host command in a command table based on receiving, from a host, a host command for the memory of a memory module;

estimating a cycle time for completing the host command at the memory; and providing, to the host via the memory of the memory module, data in a buffer of the memory module, the data being stored in the buffer based on the memory completing the host command.

19. The non-transitory computer-readable medium of claim 18, wherein the code includes further instructions executable by the processor to read, based on the host command comprising a read command, the data from a location of the memory indicated in the host command.

20. The non-transitory computer-readable medium of claim 18, wherein the code includes further instructions executable by the processor to store the data in a memory region of the buffer of the memory module, wherein the memory region is associated with a buffer address included in the host command.

* * * * *